(12) United States Patent  
Kalweit

(10) Patent No.: US 12,213,487 B2  
(45) Date of Patent: Feb. 4, 2025

(54) COOKIE MOLDING MACHINE

(71) Applicant: Andreas Kalweit, Düsseldorf (DE)

(72) Inventor: Andreas Kalweit, Düsseldorf (DE)

( * ) Notice: Subject to any disclaimer, the term of this patent is extended or adjusted under 35 U.S.C. 154(b) by 423 days.

(21) Appl. No.: 17/631,667

(22) PCT Filed: May 5, 2020

(86) PCT No.: PCT/DE2020/100373  
§ 371 (c)(1),  
(2) Date: Jan. 31, 2022

(87) PCT Pub. No.: WO2021/018334  
PCT Pub. Date: Feb. 4, 2021

(65) Prior Publication Data  
US 2022/0264898 A1  Aug. 25, 2022

(30) Foreign Application Priority Data  
Jul. 31, 2019  (DE) .................. 10 2019 120 659.6

(51) Int. Cl.  
*A21C 11/04*  (2006.01)
(52) U.S. Cl.  
CPC .................................. *A21C 11/04* (2013.01)
(58) Field of Classification Search  
CPC ....................................................... A21C 11/04  
See application file for complete search history.

(56) References Cited

U.S. PATENT DOCUMENTS

| | | | |
|---|---|---|---|
| 1,542,831 A | 6/1925 | Parsons | |
| 2,695,571 A | 11/1954 | Kalmeijer | |
| 5,576,033 A | 11/1996 | Herrera | |
| 5,862,743 A * | 1/1999 | Cimenti | A21C 5/00 99/450.2 |
| 6,530,771 B1 | 3/2003 | Clark | |
| 8,434,404 B1 | 5/2013 | Herrera | |
| 11,576,386 B2 * | 2/2023 | Biehe | B26D 1/60 |
| 2019/0357548 A1 * | 11/2019 | Biehe | A21C 11/10 |

FOREIGN PATENT DOCUMENTS

| | | |
|---|---|---|
| DE | 912441 C | 5/1954 |
| EP | 0791292 A1 | 8/1997 |
| JP | H06261670 A | 9/1994 |
| JP | 2007244358 A | 9/2007 |

OTHER PUBLICATIONS

International Search Report Dated Sep. 7, 2020, PCT/DE2020/100373, 3 Pages.

* cited by examiner

*Primary Examiner* — Seyed Masoud Malekzadeh  
(74) *Attorney, Agent, or Firm* — LUCAS & MERCANTI, LLP; Klaus P. Stoffel

(57) ABSTRACT

A cookie molding machine having a removable belt cassette for a conveyor belt and/or a cutting tool of a new type and/or a foldable second conveying device having externally closed joints and/or a funnel having removable funnel plates and/or a roller locking system of a new type.

15 Claims, 16 Drawing Sheets

COOKIE MOLDING MACHINE

CROSS-REFERENCE TO RELATED APPLICATIONS

The present application is a 371 of International application PCT/DE2020/100373, filed May 5, 2020, which claims priority of DE 10 2019 120 659.6, filed Jul. 31, 2019, the priority of these applications is hereby claimed and these applications are incorporated herein by reference.

BACKGROUND OF THE INVENTION

The invention relates to a cookie molding machine for shaping dough pieces, in particular dough pieces for foodstuff.

In the industrial production of foodstuff, machines by which foodstuff such as shortcrust dough, honey and sirup dough, or marzipan can be shaped and which in further production steps by, for example, baking and/or coating with chocolate, can subsequently be further processed to final products such as, for example, cakes or cookies, are used for shaping dough pieces.

The machines for shaping dough pieces for baked goods here are referred to as cookie molding machines.

Cookie molding machines by way of which an infed dough is able to be molded with the aid of counter-rotating rollers, of which one roller is configured as a kneading roller and the other as a molding roller, the shaped dough pieces are able to be cut from the kneading roller with the aid of a knife, and the shaped dough pieces with the aid of a transport belt are able to be transported onto a baking tray are already known from the prior art.

Such a cookie molding machine is described in patent document U.S. Pat. No. 2,695,571. The molding roller here on the shell surface thereof has recesses which serve as molds for the dough pieces to be molded. The kneading roller for conveying the dough into the region of the molding roller and of the knife has ribs so that a cross section in the manner of a gear wheel is implemented.

However, the known cookie molding machines, by virtue of the construction mode thereof, overall or in terms of modules are insufficiently accessible for installing, cleaning and servicing, so that a hygienic operation of the cookie molding machine is barely possible or possible only with great complexity. Moreover, the knives in the cookie molding machines known from the prior art have to be assembled and adjusted in a complex manner, the knives are relatively unstable, and in the case of comparatively wide embodiments the knife has to be supported by a central holder.

SUMMARY OF THE INVENTION

It is therefore an object of the invention to specify an improved cookie molding machine.

This object is achieved according to the invention by a cookie molding machine.

A further object of the invention lies in specifying a cookie molding machine having an improved servicing capability.

This object is achieved according to the invention by a cookie molding machine having a retrievable belt cartridge.

Furthermore, this object is achieved according to the invention by a cookie molding machine having a cutting device.

A further object of the invention lies in specifying a cookie molding machine having improved ergonomics in terms of the cutting device.

This object is achieved according to the invention by a cookie molding machine having a cutting device.

A further object of the invention lies in specifying a cookie molding machine which enables a more hygienic operation.

This object is achieved by a cookie molding machine having a transport device having hygienic joints.

Furthermore, this object is achieved by a cookie molding machine having an infeed installation.

Moreover, this object is achieved by a cookie molding machine having a roller locking mechanism.

The features of a cookie molding machine described hereunder form part of the invention individually as well as in all combinations that can be embodied.

A cookie molding machine according to the invention in terms of the servicing capability, simplified installation and/or cleaning thereof, overall or in terms of modules, in comparison to the prior art is improved in that said cookie molding machine according to the invention has novel details pertaining to the construction in particular in the region of the transport device and/or the infeed installation and/or the molding device and/or the cutting device.

A cookie molding machine according to the invention has in each case at least one infeed installation, one molding device, one cutting device and one transport device.

With the aid of the infeed installation, dough is able to be fed into the region of the molding device.

In one embodiment of the invention, the infeed installation is configured as a dough funnel into which the dough can be filled.

The molding device in one embodiment of the invention has at least one kneading roller and at least one molding roller. The molding roller and the kneading roller have in each case a cylindrical or hollow-cylindrical main body.

The kneading roller and the molding roller are in each case counter-rotatable about the longitudinal axis thereof and are disposed at a specific mutual spacing with parallel rotation axes.

As a result of the rotation of the kneading roller, a dough sheet is able to be configured about the shell surface of the kneading roller, the thickness of said dough sheet being determined by the spacing of the kneading roller and the molding roller.

The molding roller in the region of the shell surface thereof has at least one recess or depression, respectively, which serves as the mold and thus as the negative for the dough pieces to be shaped. The molding roller preferably has a plurality of molds which are next to one another and in embodiments of the invention can be repeated along the circumference of the molding roller. Here, the multiple disposal of the same mold as well as the disposal of different molds on one molding roller is possible.

In one preferred embodiment of the invention, the kneading roller has a structured shell surface, for example configured as ribs running parallel to the rotation axis, such that the dough is better able to be transported by the kneading roller.

As a result of the counter-rotating capability of the molding roller in relation to the kneading roller, raised quantities of dough are able to be applied to the dough sheet configured about the kneading roller, said raised quantities of dough being positives of the mold or molds, respectively, disposed on the molding roller.

In one preferred embodiment of the invention, the at least one molding roller is able to be heated. To this end, the cookie molding machine according to the invention has a heating device which implements the heating of the molding roller. Heating the molding roller is advantageous with a view to processing specific doughs which would otherwise excessively adhere to the molding roller.

The cutting tool of the cutting device in the rotation direction of the molding roller is disposed so as to be behind the molding roller.

In one embodiment of the invention, the cutting tool has a knife which is capable of oscillation and in the longitudinal direction of the kneading roller has a cutting edge that is parallel to the nearest portion of the shell surface of the kneading roller.

The dough positives that have been applied to the dough sheet by the molds of the molding roller are able to be cut off from the dough sheet with the aid of the cutting tool.

The dough pieces separated from the dough sheet with the aid of the cutting tool are able to be transported from the region of the molding installation away to a baking tray and/or to transport belts of a second transport device with the aid of the transport device.

In one preferred embodiment of the invention, the transport device has at least one transport belt.

In one particularly preferred embodiment of the invention, the cookie molding machine has at least one first transport device having a retrievable belt cartridge. The belt cartridge here is constructed such that the latter is able to be easily and rapidly uninstalled from the cookie molding machine, for example in order for the transport belt to be cleaned or replaced.

In one embodiment of the invention, the belt cartridge has a transport belt which is able to be driven so as to revolve on a guide.

In one embodiment of the invention, the transport belt is able to be driven with the aid of a rotatable belt drive roller.

In one particularly preferred embodiment of the invention, the directional stability of the transport belt of the belt cassette is able to be supported by a drive shaft which conically tapers towards the ends on both sides.

In one preferred embodiment of the invention, the belt cartridge has a deflection and tension roll by way of which the transport belt is able to be tensioned. To this end, the axis of the deflection and tension roll in relation to the stationary axis of the belt drive roller is able to be displaced in a direction perpendicular to the parallel running axes of the deflection and tension roll and of the belt drive roller.

In one particularly preferred embodiment of the invention, excessive tensioning of the transport belt of the belt cartridge is able to be avoided as a matter of construction by a spring mechanism.

In one embodiment of the invention, the belt cartridge has a support device on which the belt drive roller and the deflection and tension roll are rotatably mounted. The support device preferably has two plate-type lateral walls which are disposed at a spacing so as to be mutually parallel so that the belt drive roller and the deflection and tension roll in the longitudinal direction are able to be positioned between the lateral walls.

In one advantageous embodiment, the belt cartridge has an adjustment wheel for adjusting the running of the belt, positioning of the transport belt in a direction transverse to the running direction being enabled by said adjustment wheel. This is necessary in particular when the self-regulating mechanism, for example as a consequence of deposits of dough on the drive shaft and an associated variation of the relevant shaft geometry, no longer suffices.

In one preferred embodiment of the invention, the guide for the transport belt on the upper side of the belt cartridge is configured in such a manner that the transport belt in the running direction has a slope which, from a first transfer region of the dough pieces behind the cutting tool, slopes downward in the direction of a second transfer region where the dough pieces are able to be transferred from the transport belt of the belt cartridge to a further transport belt and/or able to be deposited on a baking tray. The transport region of the transport belt is disposed between the transfer regions.

In one particularly preferred embodiment of the invention, the transport belt in an assembled state of the belt cartridge in the cookie molding machine slopes downward in a uniform manner in the transport region, and the surface of the transport belt in the transport region lies approximately in one plane. As a result of a slope being implemented by way of the transport belt of the belt cartridge in the transport region for dough pieces, and as a result of the corresponding guiding action, the accumulation of dough remnants, in particular beside the transport belt, is reduced in comparison to an approximately horizontal arrangement.

In the second transfer region of the transport belt of the belt cartridge, that is to say at the end of the transport region, the transport belt in one preferred embodiment of the invention is able to be deflected with the aid of the guide and able to be returned below the transport belt in the transport region.

In one advantageous embodiment of the invention, a dough scraping installation, by way of which dough remnants are able to be scraped from the surface of the transport belt such that ideally few dough remnants can make their way into the region of the deflection and tension roll as well as of the belt drive roller, in particular, is disposed in the running direction of the transport belt behind the second transfer region and ahead of the deflection and tension roll as well as the belt drive roller.

In one embodiment of the invention, the belt cartridge is able to be locked in the cookie molding machine.

In one preferred embodiment of the invention, the belt cartridge has a connection system which communicates with the installation location of the belt cartridge in the cookie molding machine and by way of which the belt cartridge is able to be reliably guided when being inserted into as well as being retrieved from the cookie molding machine, so that a faulty assembly of the belt cartridge in the cookie molding machine is precluded.

In one particularly preferred embodiment of the invention, the connection system on the belt cartridge is implemented as guide grooves that are disposed on the external sides of the lateral walls and in which guide pins of the cookie molding machine engage.

Moreover, a locking installation for locking the belt cartridge in the correctly assembled position within the cookie molding machine is particularly preferably implemented.

In one embodiment of the invention, the transport belt of the uninstalled belt cartridge is able to be tensioned and/or relaxed with the aid of at least one tensioning means. For example, the at least one tensioning means has at least one tensioning lever.

The relaxed transport belt is able to be retrieved from the belt cartridge and/or able to be replaced.

In one preferred embodiment of the invention, the cookie molding machine has a motor for driving the belt drive roller, said motor being disposed outside the belt cartridge.

As a result, the use of electronic components in the belt cartridge is avoided so that the belt cartridge can be easily cleaned by using water and cleaning agents.

In one embodiment of the invention, the belt drive roller of the belt cartridge is able to be driven with the aid of a drive sprocket of a motor disposed outside the belt cartridge.

According to the invention, the use of transport belts made from various materials is considered. For example, the use of transport belts made from plastics material, woven cotton or woven plastics materials is possible.

The cutting tool, and in particular the adjustment of the knife, is particularly important in a cookie molding machine, because dissimilar thicknesses of the severed dough pieces cause non-uniform baking outcomes. Comparatively thin dough pieces at a same baking time and baking temperature are exposed to a greater thermal influence and are thus more intensely baked. Therefore, for a consistent and predictable quality of the products, the knife must remain absolutely straight during the cutting procedure and must cut parallel to the shell surface of the kneading roller and cut to a uniform thickness on the entire demolding width.

In one preferred embodiment of the invention, the cutting tool has a knife which is configured as a band steel knife and which with the aid of a tensioning device is able to be mounted and tensioned.

In one particularly preferred embodiment of the invention, the knife is provided with a PTFE coating.

In one particularly preferred embodiment of the invention, the tensioning device is configured as a tensioning bracket having at least one tensioning lever.

For example, the knife on one side of the tensioning bracket is fixed with the aid of a fastening means. Disposed on the other side of the tensioning bracket is a tensioning lever on which the knife is fixed with the aid of a fastening means, wherein the knife is able to be tensioned by the tensioning lever, for example with the aid of a screw.

In one embodiment of the invention, the cutting tool has a knife shaft which is able to be adjusted and driven in an oscillating manner.

In one embodiment of the invention, the tensioning device by way of which the blade is able to be mounted and tensioned is disposed on the knife shaft. The tensioning device here is fixedly connected to the knife shaft, wherein the connection can also be embodied as a releasable connection, for example a screw connection.

In one particularly preferred embodiment of the invention, the cutting edge of the knife runs parallel to the axis of the knife shaft.

The knife shaft with the aid of a knife drive is able to be oscillated in the direction of the longitudinal extent of the shaft so that the knife is also able to be oscillated in the direction of the longitudinal extent thereof.

In one embodiment of the invention, the knife drive is configured as a rotatable motor, the rotating movement of the latter with the aid of a transmission mechanism being able to be converted to a translatory movement of the knife shaft.

In one embodiment of the invention, the transmission mechanism is configured as a block which is connected to the knife shaft and has an opening configured as a slot, wherein a roller bearing eccentrically mounted on the drive shaft of the knife drive, the latter being configured as a rotatable motor, is rotatable in the slot. The direction of the longitudinal extent of the slot here is embodied so as to be perpendicular to the rotation axis of the knife shaft, and the rotation axis of the roller bearing is disposed so as to be parallel to the rotation axis of the drive shaft of the motor.

In one particularly preferred embodiment of the invention, the transmission mechanism has a slider which is connected to the block and in which the roller bearing eccentrically mounted on the drive shaft of the rotatable motor runs in a slot. The friction created, and thus the wear, is able to be reduced by using a slider.

In another embodiment of the invention, the knife drive is configured as a linear drive by way of which the knife shaft is able to be directly driven in a translatory manner.

In one preferred embodiment of a cookie molding machine, the knife shaft and thus also the cutting edge of the knife are disposed so as to be parallel to the rotation axis of the kneading roller. The cutting edge is furthermore aligned counter to the running direction of the kneading roller.

In one particularly preferred embodiment of the invention, the knife with the aid of a pivoting device is able to be pivoted about the axis of the knife shaft so that the spacing of the cutting edge of the knife from the shell surface of the kneading roller is adjustable. An adjustment capability of the thickness of the dough pieces as a function of the depth of the molds of the molding roller is thus enabled, wherein pivoting the knife toward the shell surface of the kneading roller means increasing the thickness, and pivoting the knife away from the shell surface of the kneading roller means decreasing the thickness of the dough pieces.

In one particularly preferred embodiment of the invention, the knife shaft in the region of the cookie machine is mounted by way of an eccentric bearing such that the parallelism of the cutting edge of the knife and the shell surface of the kneading roller can be guaranteed even after the knife shaft or the knife, respectively, has been pivoted.

To this end, the eccentric bearing preferably has an adjustment installation for adjusting the bearing position of the knife shaft. Furthermore, in one embodiment of the invention, the bearing of the knife shaft in an adjusted bearing position is able to be fixed by way of fastening means.

In one advantageous embodiment of the invention, the pivoting of the knife is able to be so finely adjusted that the spacing of the cutting edge of the knife from the shell surface of the kneading roller in the cutting region, and thus the thickness of the dough pieces, is able to be precisely predefined to a tenth of a millimeter.

In one embodiment of the invention, the pivoting device has a set screw for adjusting the knife position, wherein the pivoting angle of the knife shaft, or of the knife, respectively, by way of a coupling mechanism is able to be controlled by the position of the set screw.

In one embodiment of the invention, the coupling mechanism has a cam which with the aid of the set screw is able to be pivoted about an axis. The set screw is particularly preferably coupled to the cam by way of a locking disk so that the cam is pivotable about the axis thereof by defined steps. Furthermore, the coupling mechanism in this embodiment has a contact element which protrudes perpendicularly from the knife shaft and by way of which the pivoting of the cam can be transmitted to the knife shaft. The coupling mechanism of this embodiment furthermore preferably has a spring element which at least indirectly exerts a force on the contact element such that the contact element is at all times in contact with the cam.

In one particularly preferred embodiment of the invention, the translatory movement of the knife axis and of the components connected to the knife axis with the aid of the coupling mechanism is able to be decoupled at least from the set screw for adjusting the pivoting of the knife so that the set screw is able to be assembled so as to be locationally fixed on the cookie molding machine.

In one particularly preferred embodiment, the contact element of the coupling mechanism to this end is configured as a roll which is rotatable about an axis perpendicular to the rotation axis of the knife shaft such that the cam, with the exception of the rotatability about the axis thereof, is a stationary component and the contact element by way of the movement of the knife axis is able to roll on one side of the cam.

In one advantageous embodiment of the invention, the pivotability of the knife shaft is restricted with the aid of the pivoting device, such that pivoting the knife into the immediate region of the shell surface of the kneading roller is prevented. As a result, damage to the knife and/or to the kneading roller by a knife pressing onto the shell surface of the kneading roller is precluded.

In one embodiment of the invention, the pivoting capability of the knife shaft by the pivoting device is restricted by means of a detent element.

In one particularly preferred embodiment of the invention, the knife with the aid of the knife drive is able to be oscillated at high frequencies.

In one embodiment of the invention, the knife with the aid of the knife drive is able to be oscillated at a frequency in a frequency range from 20 to 30 Hz.

In one advantageous embodiment, at least one of the oscillating components of the cutting tool, for reducing the centripetal forces arising during the oscillation, is implemented in a lightweight construction mode such that potential loads on bearings associated with the centripetal forces can be ideally minimized.

In one embodiment of the invention, the tensioning device to this end is at least partially manufactured in a lightweight construction mode.

In one preferred embodiment of the invention, the tensioning device is at least partially made from high-tensile and lightweight aircraft aluminum.

In one embodiment of the invention, the knife shaft to this end is at least partially manufactured in a lightweight construction mode.

In one preferred embodiment of the invention, the knife shaft is configured substantially as a tube which only in the end regions is reinforced so as to form a solid bar.

In one embodiment of the invention, the cookie machine has at least one second transport device by way of which the dough pieces that have been transported away from the region of the cutting tool with the aid of the first transport installation, for example configured as a belt cartridge, are able to be transported directly onward or onto baking trays.

The second transport device is particularly preferably disposed below the first transport device and in an approximately horizontal manner extends in a direction through the entire cookie molding machine.

In one embodiment of the invention, the second transport device has at least one transport belt, a guide for the at least one transport belt, and a drive for the at least one transport belt of the second transport device.

In one embodiment of the invention, the second transport device has a plurality of narrow transport belts which run approximately in parallel and are disposed at a mutual spacing such that dough crumbs dropping down from the region of the first transport device can drop through between the transport belts.

For easier infeeding of baking trays and outfeeding of baking trays populated with dough pieces, the second transport device, in and counter to the running direction of the transport belt of the second transport device, preferably protrudes beyond the remaining part of the cookie molding machine.

For storing in a space-saving manner or transporting, in one advantageous embodiment of the invention the parts of the second transport device that protrude beyond the remaining part of the cookie molding machine are able to be folded. To this end, the second transport device for each region of the second transport device that protrudes beyond the remaining part of the cookie molding machine has at least one joint, the respective region of the second transport device being able to be folded about the rotation axis of said joint.

In one particularly preferred embodiment of the invention, the at least one joint is completely externally sealed such that a hygienic construction which at the same time also minimizes the risk of injury is implemented.

In one embodiment of the invention, the second transport device has two joints for each folding region.

In one embodiment of the invention, the joint has a housing which is divided into a stationary part and a movable part. The stationary part of the housing is connected to the support structure of the stationary part of the second transport device, and the movable part of the joint is connected to a folding region of the second transport device.

In one preferred embodiment of the invention, the joint has a locked position in which the joint is not rotatable or rotatable only upward, and a free position in which the joint is rotatable upward and downward.

In one advantageous embodiment of the invention, this functionality is implemented in that the joint in the interior has at least one guide element which is connected to the stationary part of the housing and in the guide structure of which, in the locked state of the joint, at least one guided element which is fixedly connected to the movable part of the housing of the joint runs. In the free position of the joint, the guided element does not run in the guide structure.

For example, the stationary guide element has a groove in which a guided element embodied in the manner of a pin is able to be guided. The use of at least one stationary guide element configured in the manner of a pin and of a guided element having a groove is also conceivable.

In one embodiment of the invention, the stationary part and the movable part of the housing of the joint are in each case embodied so as to be hollow-cylindrical. The at least one stationary guide element is disposed in the stationary part of the housing. The stationary part and the movable part of the housing are disposed next to one another such that the central axes of the hollow cylinders are in alignment. An annular seal, or a slip ring, respectively, by way of which the housing is able to be sealed between the housing parts is disposed between the housing parts. The external openings of the hollow-cylindrical housing parts are closed with the aid of end caps.

In one embodiment of the invention, both end caps are connected to the movable part of the housing. The end caps are connected to one another by a central guide shank, the longitudinal axis of the latter implementing the rotation axis of the joint. To this end, the guide shank is mounted in the stationary housing part, for example in the stationary guide element, so as to be rotatable about the longitudinal axis of said guide shank. As a result of the end caps being connected to the movable housing part, said end caps are coupled to one another at least with a view to a rotating movement of the movable housing part.

In another embodiment of the invention, the end cap externally closing the stationary part of the housing is likewise embodied so as to be stationary. The guide shank which is connected to the end cap of the movable housing part is mounted in the movable part of the housing, for example in the stationary guide element, or in a bearing that is connected to the end cap of the stationary housing part, so as to be rotatable about the longitudinal axis of said guide shank.

In one embodiment of the invention, at least one guided element is fixedly connected to the end cap of the movable housing part and is configured in the manner of a pin. The at least one guided element here, by displacement in the axial direction of the central guide shank, is able to be moved out of the guide structure of the stationary guide element so that the joint is able to be transferred to the free position.

In a further embodiment of the invention, with the exception of the housing parts, the abovementioned movable parts of the joint are embodied so as to be stationary, and the afore-mentioned stationary parts are embodied so as to be movable.

The joints according to the invention for a cookie molding machine are easy to lock, do not have any locations where an operator of the machine could be jammed, and as a result of the closed surface are hygienic and able to be finely adjusted by way of a detent.

In one further embodiment of the cookie molding machine according to the invention, the latter has an infeed installation which is embodied as a funnel and enables improved hygiene while operating the cookie molding machine.

To this end, the funnel is constructed in such a manner that said funnel is easy to clean. In one preferred embodiment of the invention, this is implemented by funnel panels which are retrievable from the funnel.

In an assembled state, at least part of the internal walls of the funnel are clad with the aid of the funnel panels so that the internal walls of the funnel that are disposed in the region in contact with foodstuff are better accessible for cleaning.

In one preferred embodiment of the invention, at least the front wall and the rear wall of the funnel are provided with retrievable funnel panels.

In one further embodiment of the invention, the cookie molding machine in the region of the funnel has devices for enhancing the occupational safety of the cookie molding machine.

To be avoided in particular is the intrusion of extremities or parts of clothing or accessories, respectively, of an operator into the region of the roller pair provided by the molding roller and the kneading roller.

In one embodiment of the invention, the funnel to this end has a funnel lid which is configured as a protective mesh and by way of which the funnel is able to be closed on the open side thereof.

In one preferred embodiment, the funnel lid is coupled to a switch such that an operation of the roller pair is prevented in the event of an opened funnel lid.

The switch is preferably disposed in the interior of the cookie molding machine such that said switch is not able to be bypassed by an operator of the machine. For example, the switch can be disposed in the gear housing.

In one embodiment of the invention, the funnel lid with the aid of at least one hinge is connected to the funnel such that the funnel lid is able to be folded onto the funnel.

In one further embodiment of the invention, the funnel on those sides of the funnel that are provided with retrievable funnel panels has protective wall elements, for example embodied as protective meshes or protective panels, such that reaching into the funnel on these sides is impossible in the event of retrievable funnel panels not being assembled.

In one embodiment of the invention, the funnel lateral walls comprise the lateral faces of the roller pair and lie on the shell surfaces of the kneading roller and of the molding roller as well as on the shoulders of said rollers. As a result of this embodiment of the funnel lateral walls, the funnel in the region of the roller intake is very well sealed so that the dough remains in the funnel region.

In one advantageous embodiment of the invention, the sealing faces on the funnel lateral walls have ramps so that the dough during the operation is always able to be fed toward the inside of the funnel and a build-up on the funnel walls is avoidable.

In one embodiment of the invention, the funnel of the infeed installation is spring-mounted so that the weight of the funnel during opening and closing is reduced such that the risk of injury to an operator is able to be minimized.

In one preferred embodiment of the invention, the funnel is rotatably mounted by way of a shaft which with the aid of a tension spring is tensioned by way of a lever arm.

In one embodiment of the invention, this spring assembly is disposed in the gearbox of the cookie molding machine.

In one further embodiment of a cookie molding machine according to the invention, the latter has in each case one roller locking mechanism for the molding roller and the kneading roller.

The roller locking mechanism preferably has a fixing installation by way of which one roller is in each case able to be aligned and fixed in the aligned position in such a manner that the respective roller has a fixed rotation axis.

The fixing installation of the rollers is particularly preferably configured as a quick clamping installation.

The molding roller and the kneading roller are able to be installed and uninstalled in a rapid and comfortable manner with the aid of a roller locking mechanism having a quick clamping installation.

In one preferred embodiment of the invention, the molding roller and the kneading roller are in each case able to be braced between two rollers flanges, wherein one roller flange is in each case spring-mounted and the other roller flange is in each case connected to the fixing installation.

The roller flange connected to the fixing installation here is configured as a locking flange which with the aid of a cotter pin is able to be laterally pressed against the respective roller. The cotter pin is mounted in the locking flange so as to be rotatable about the rotation axis of the roller.

In one embodiment of the invention, the locking flange to this end has a roller bearing, for example configured as a ball bearing.

In one embodiment of the invention in which the fixing installation is configured as a quick clamping installation, the cotter pin on the other side thereof is connected to a friction sleeve that has a helical groove. The friction sleeve is rotatably mounted in a fastening flange, wherein an entrainment pin which is disposed in a locationally fixed manner protrudes into the helical groove. As a result of a rotation of the friction sleeve, the friction sleeve with the aid of a lever connected to the friction sleeve is displaceable in the axial direction, as a result of which the cotter pin and thus the locking flange are able to be braced in relation to the roller.

The rollers on the sides thereof have receptacle sockets configured as depressions into which roller flanges are able to be pushed by way of an exact fit. As a result thereof, the rollers are able to be centered on the respective rotation axis provided.

As a result of the one-sided spring-mounting of the rollers with the aid of the roller locking mechanism, the roller bearings disposed in the region of the locking flange, with the aid of the fixing installation, are able to be sufficiently reduced as a result of the tension of the roller. Furthermore, a transverse force arising as a result of the heating of a roller and the roller expansion associated therewith is able to be reduced.

In one embodiment of the invention, the rollers with the aid of a gear mechanism are able to be driven by way of at least one motor.

In order for the power to be transmitted to the rollers, one roller flange has in each case at least two entrainment pins which in the direction of the roller protrude from the flange and engage in corresponding recesses in the region of the roller body.

In one preferred embodiment, the roller flange that is in each case not connected to the fixing installation is coupled to the gear mechanism of the roller drive.

In one particularly preferred embodiment of the invention, the cookie molding machine for the molding roller and the kneading roller has in each case at least one placement device which is configured as a positioning pin, for example, and on which the respective roller during installation is able to be placed close to the position envisaged for the operation in the cookie molding machine. By tensioning the roller with the aid of the quick tensioning device, said roller is able to be lifted from the placing device, or the positioning pins, respectively, and is thus freely rotatable.

In one embodiment of the invention, the molding roller is configured as a segment roller.

In one preferred embodiment of the invention, the molding roller to this end in the axial direction is divided into a plurality of roller segments which are individually interchangeable.

In one embodiment, the molding roller configured as a segment roller has a solid roller core which is configured so as to be cylindrical or tubular and on which the roller segments are able to be positioned next to one another.

The embodiment of the molding roller as a segment roller offers the advantage that individual roller segments and thus the molds of these roller segments are interchangeable for the production such that it is possible for motifs to be changed also on a single molding roller.

In one embodiment of the invention, the cookie molding machine has the above-described joints for the second transport device, an above-described funnel having retrievable funnel panels, and an above-described roller locking mechanism.

In one preferred embodiment of the invention, the cookie molding machine is configured for demolding dough pieces or pastry bases of dissimilar thicknesses and/or sizes and/or shapes and/or surface structures.

In one preferred embodiment of the invention, the cookie molding machine is adapted to transferring the dough pieces onto commercially available baking trays, wherein the widths of the baking trays are 250 mm, 400 mm, 450 mm and 580 mm, and the heights of the baking trays vary between 1 mm and 55 mm. In one advantageous embodiment of the invention, the use of baking trays of non-standard sizes is likewise possible.

In one particularly preferred embodiment of the invention, the cookie molding machine is able to be configured such that the latter is able to be integrated in existing production lines.

In one embodiment of the invention, the second transport device is configured for transporting baking trays and is height-adjustable in a stepless manner such that, with the aid of the first transport device, baking trays or flan trays of dissimilar heights are able to be lined with dough pieces. In particular, the height in relation to the transfer edge of the transport belt of the first transport device is adjustable.

In one embodiment of the invention, the bulk of the faces have inclinations/slopes such that the run-off of water and crumbs for example is facilitated and a permanent accumulation of dirt is avoidable.

In one further embodiment of the invention, the cookie molding machine has a PLC controller.

In one preferred embodiment of the invention, the HMI of the cookie molding machine has a movable touchscreen.

In one embodiment of the invention, help and assistance for an operator of the cookie molding machine is able to be displayed with the aid of the screen.

In one embodiment of the invention, the molding roller heating is configured as air convection heating.

In one further embodiment of the invention, the molding roller heating is configured as infrared heating.

In one further embodiment of the invention, the oscillation frequency of the knife is able to be adjusted in steps.

In one preferred embodiment of the invention, the oscillation frequency is able to be adjusted in two steps so that very soft doughs are able to be cut at a higher oscillation frequency. This is advantageous because soft doughs would otherwise excessively adhere to the knife and be compressed. The lower oscillation frequency is able to be set in the event of firmer doughs, as a result of which the mechanical stress on the cutting device is able to be reduced.

In one embodiment of the invention, the knife is able to be covered automatically by a movable cover plate as soon as the funnel is opened. As a result thereof, an exposed knife is avoided, this otherwise potentially representing a risk of injury.

In one further embodiment of the invention, the cookie molding machine has sensors by way of which a precise positioning of the dough pieces on a baking tray is able to be monitored.

In one preferred embodiment of the invention, the cookie molding machine with the aid of the controller of the cookie molding machine is able to be automatically stopped as soon as a baking tray has been completely populated with dough pieces. This is able to be detected with the aid of the sensors.

In one embodiment of the invention, the latter in the region of the second transport device has adjustable guide strips for baking trays so that the baking trays can be precisely fed. The guide strips here are constructed such that said guide strips are easy to clean.

In one further embodiment of the invention, a drip tray is disposed below the first transport device by way of which remnants of dough scraped from the transport belt with the aid of the dough scraping installation, for example, are able to be collected so that these remnants of dough can be reused.

In one embodiment of the invention, the latter has a roller placement area on which molding rollers and/or kneading rollers are able to be placed in a horizontal alignment. The roller placement area is preferably disposed in the chassis of the cookie molding machine. The rollers are well protected in the roller placement area and can dry therein after use and cleaning.

In one embodiment of the invention, required information and type identification marks on the machine are implemented by means of electro-galvanic marking technology such that these signs cannot be removed. Signage of this type is furthermore suitable for surfaces which are in direct contact with foodstuff and splashes.

BRIEF DESCRIPTION OF THE DRAWING

Exemplary embodiments of the invention are schematically illustrated in the figures hereunder in which.

DETAILED DESCRIPTION OF THE INVENTION

Figure 1:
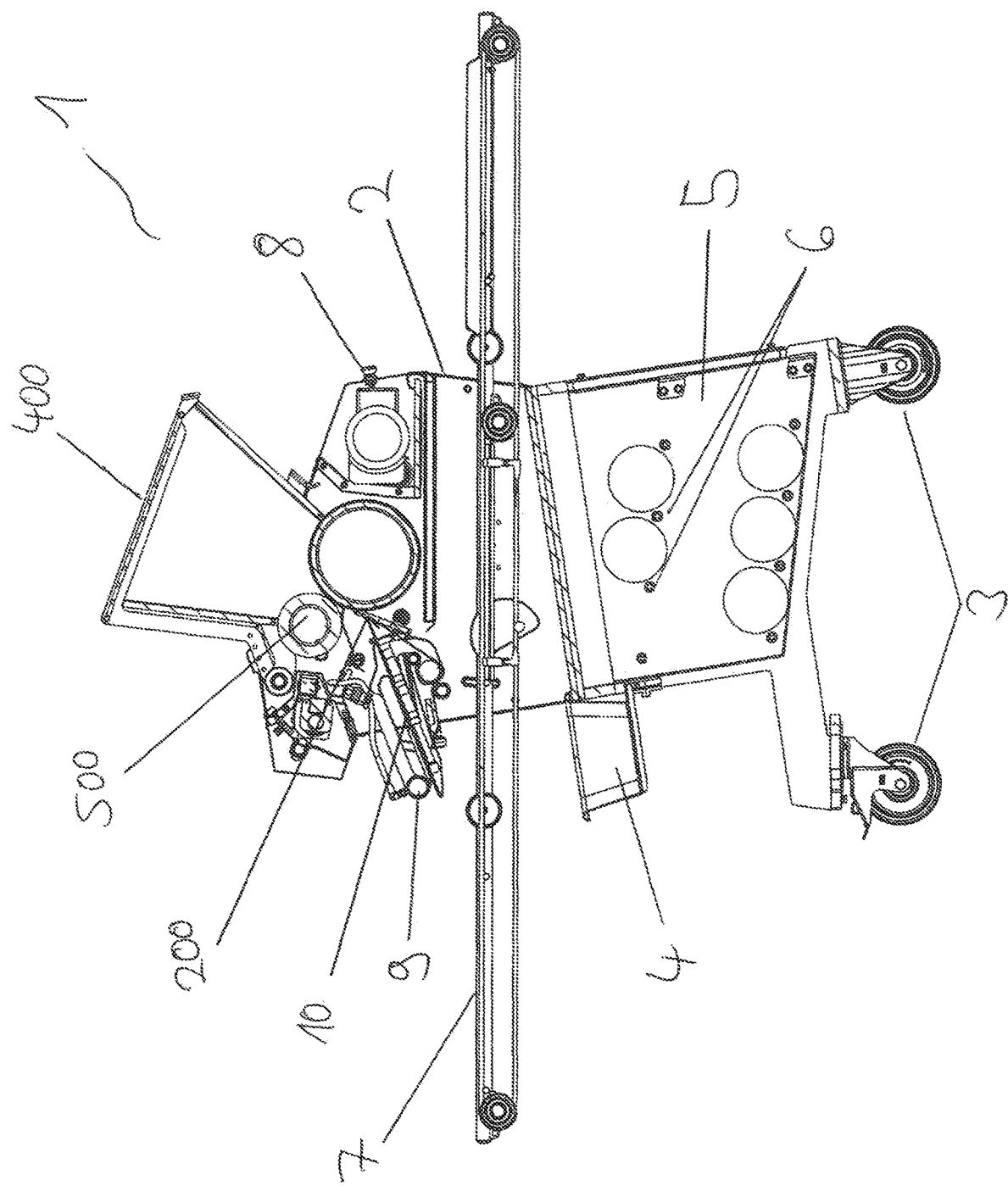
FIG. 1: shows a lateral view of a vertical section of a cookie molding machine according to the invention.

FIG. 1 shows a lateral view of a vertical section of a cookie molding machine (1) according to the invention. The cookie molding machine (1) has a housing (2) in which, or on which, respectively, the further components of the cookie molding machine (1) are disposed. Rolls (3) are disposed on the lower side of the housing (2) so that the cookie molding machine (1) can be comfortably moved.

An infeed installation (400) which is configured as a dough funnel into which dough (50) is able to be filled is disposed in the upper region of the cookie molding machine (1). With the aid of the molding device (500), the dough (50) is able to be shaped to dough pieces (52) which by means of the cutting device (200) are able to be separated from the remaining dough (51). Upon separation of the dough pieces (52), the latter with the aid of a first transport device (10) are able to be transported from the region of the molding device (500) and the cutting device (200) into the region of a second transport device (7) and able to be transferred onto baking trays (60) that are able to be transported by the second transport device (7). A drip tray (4) for remnants of dough dropping down is disposed below the first transport device (10) for the dough pieces (52). In the lower region of the cookie molding machine (1) the latter has a storage space (5) which has roller placement areas (6) for the rollers of the molding device (500). Furthermore, the cookie molding machine (1) has an operating element (8), which is configured as a switch, and a sensor (9) for detecting the dough.

Figure 2:
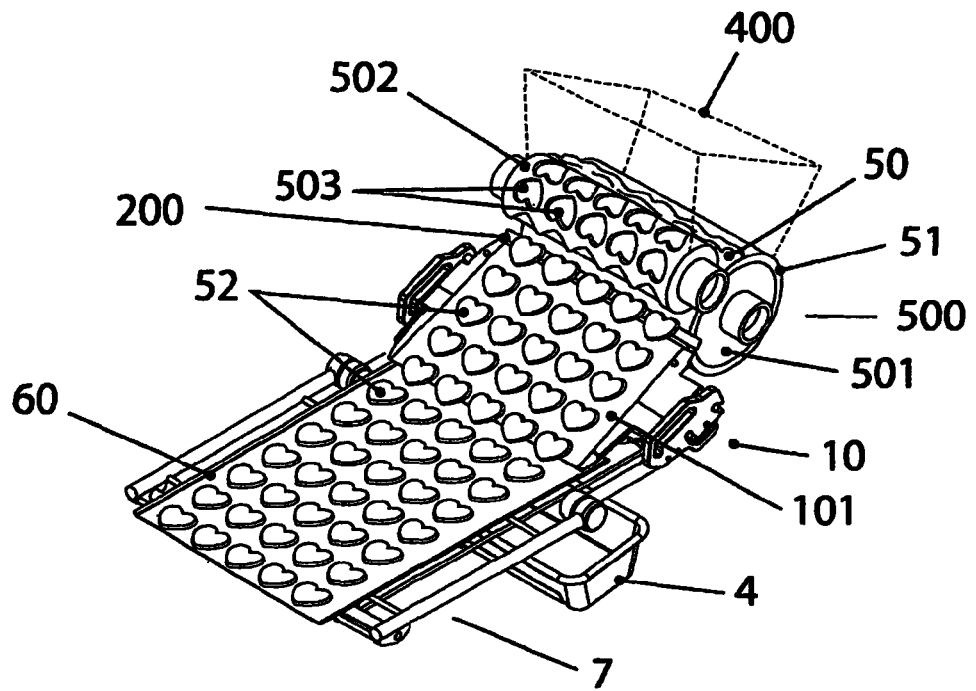
FIG. 2: shows a perspective view of a fragment of a cookie molding machine according to the invention.

A perspective view of a fragment of a cookie molding machine (1) according to the invention is illustrated for highlighting the functional principle in FIG. 2. The molding device (500) has counter-rotatable rollers, wherein one roller is configured as a kneading roller (501) and one roller is configured as a molding roller (502). The molding roller (501) in the shell surface thereof has molds (503) which are configured as heart-shaped recesses, wherein five molds (503) are disposed in a row, the latter moreover being repeated multiple times along the circumference of the molding roller (502). A dough sheet (51) has been configured on the shell surface of the kneading roller (501), onto which sheet molded dough pieces (52) are able to be embossed by means of the molds (503) of the molding roller (502). These dough pieces (52) with the aid of the cutting device (200) are able to be cut off from the dough sheet (51) and, by way of a first transport device (10) which has a transport belt (101) are able to be transported toward a second transport device (7) and able to be deposited onto baking trays (60) that are able to be transported with the aid of the second transport device (7). A drip tray (4) for remnants of dough is disposed below the first transport device (10) and the second transport device (7).

Figure 3:
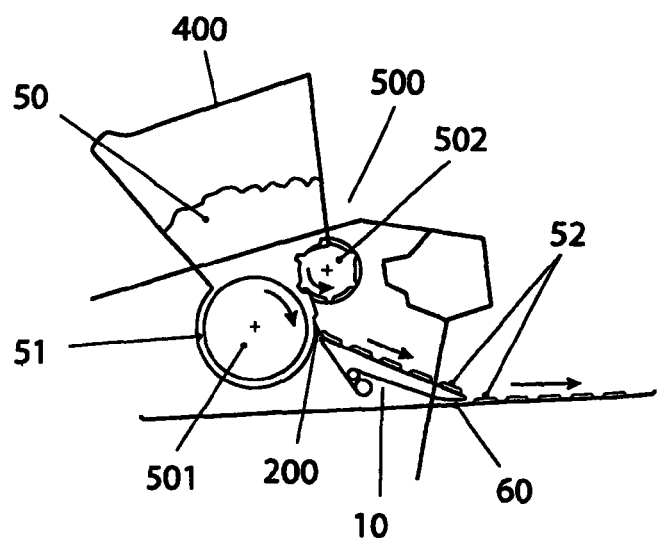
FIG. 3: shows a schematic lateral view of a section in the region of the fragment of a cookie molding machine according to the invention illustrated in FIG. 2.

FIG. 3 shows a schematic lateral view of a section in the region of the fragment of a cookie molding machine (1) according to the invention illustrated in FIG. 2. The rotating direction of the molding roller (502) is counter-clockwise, while the rotating direction of the kneading roller (501) is clockwise.

Figure 4:
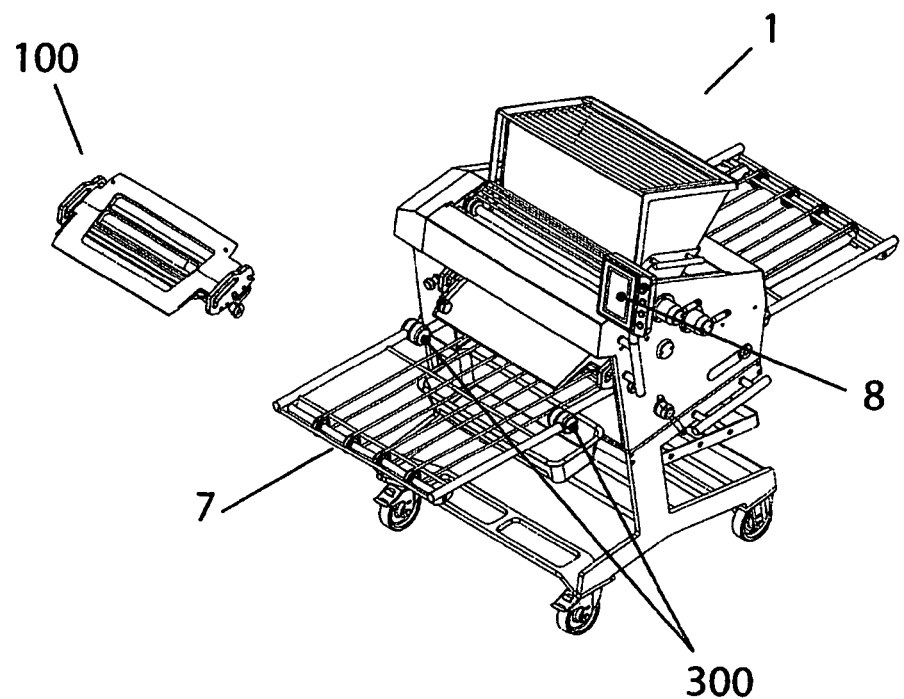
FIG. 4: shows a perspective view of a cookie molding machine according to the invention having a retrievable belt cartridge.

Illustrated in FIG. 4 is a perspective view of a cookie molding machine (1) according to the invention, having a first transport device (10) configured as a retrievable belt cartridge (100). The cookie molding machine (1) has an operating element (8) having a screen. The second transport device (7) has joints (300) by way of which the second transport device (7) is able to be folded in regions.

Figure 5:
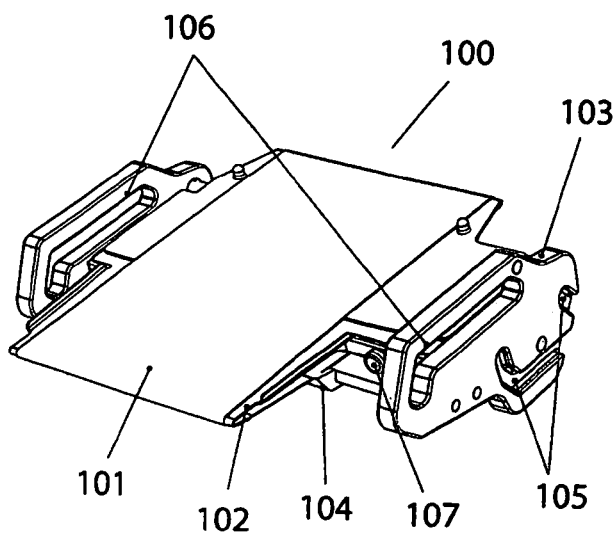
FIG. 5: shows a perspective view of a transport device, configured as a belt cartridge, of a cookie molding machine according to the invention.

FIG. 5 shows a perspective view of a belt cartridge (100) of a first transport device (10). The transport belt (101) is guided so as to be able to be driven on a guide (102). The belt cartridge (100) has a support device (103) which mounts the guide (102) and has two plate-type lateral walls. A dough scraping installation (104) by way of which dough (50) that adheres to the transport belt (101) can be scraped from the latter is disposed on the lower side of the belt cartridge (100). Guide grooves of the connection installation (105) for connecting the belt cartridge (100) of the first transport device (10) to the cookie molding machine (1) are disposed externally in the region of the lateral walls of the belt cartridge (100). Furthermore, the belt cartridge (100) in the upper region of the lateral walls has handles (106) by way of which the belt cartridge (100) is able to be handled by an operator or maintenance personnel, respectively. An operating element, configured as an adjustment wheel, of a belt run adjustment device (107) is disposed between the guide (102) of the transport belt (101) and the right lateral wall of the belt cartridge (100).

Figure 6:
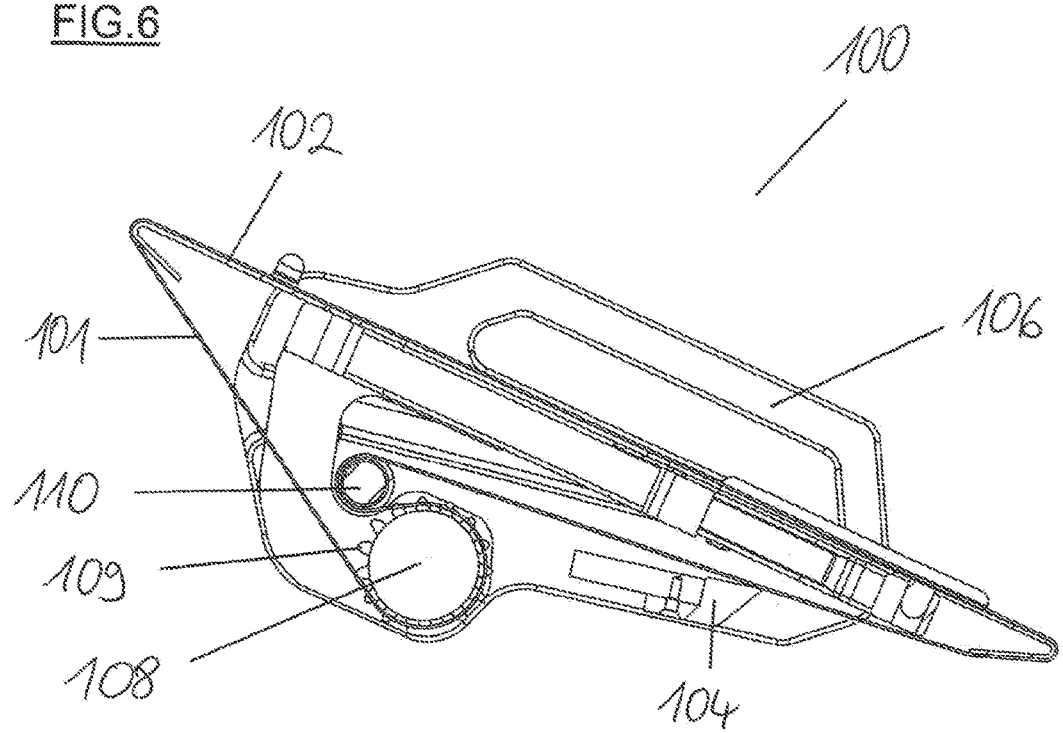
FIG. 6: shows a lateral view of a vertical section of the belt cartridge from FIG. 5.

A lateral view of a vertical section of the belt cartridge (100) of the first transport device (10) is illustrated in FIG. 6. The transport belt (101) runs on the guide (102) and is able to be driven with the aid of a belt drive roller (108). A drive sprocket (109), by way of which the belt drive roller (108) with the aid of a drive disposed outside the belt cartridge (100) of the first transport device (10) is able to be driven, is connected to the belt drive roller (108). The transport belt (101) is able to be tensioned by the deflection and tension roll (110).

Figure 7:
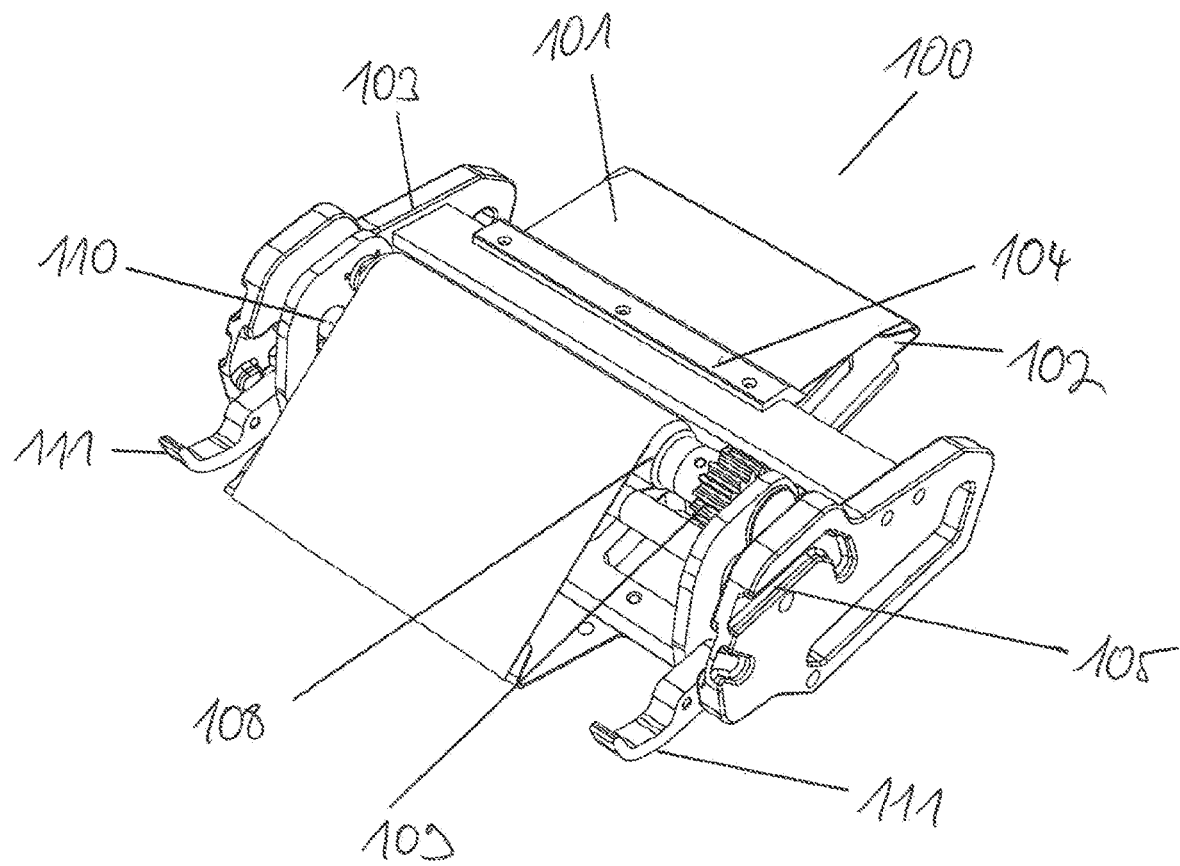
FIG. 7: shows a perspective view of the belt cartridge from FIGS. 5 and 6, having a folded out locking mechanism.

FIG. 7 shows a perspective illustration of the belt cartridge (100) of the first transport device (10) illustrated in FIGS. 5 and 6 when viewed from the lower side. For tensioning the transport belt (101) with the aid of the tension and deflection roll (110), the belt cartridge (100) has two tensioning means (111) configured as tensioning levers. In the illustrated position of the tensioning means (111) the transport belt (101) is relaxed so that the transport belt (101) is able to be replaced.

Figure 8:
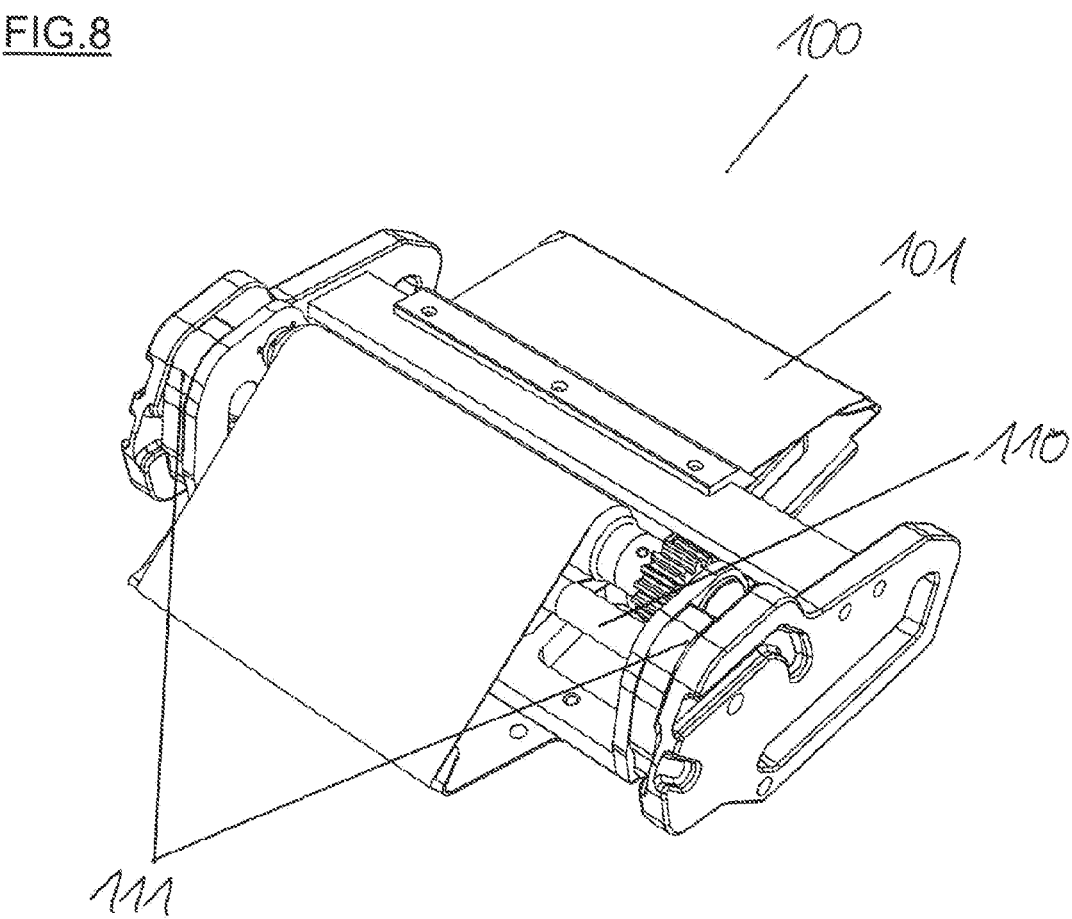
FIG. 8: shows a perspective view of the belt cartridge from FIG. 7, having a folded in locking mechanism.

In FIG. 8, the belt cartridge (100) shown in FIGS. 5 to 7 is illustrated having tensioning means (111) configured as tensioning levers and having a transport belt (101) that is tensioned so as to correspond to the position of the tensioning levers.

Figure 9:
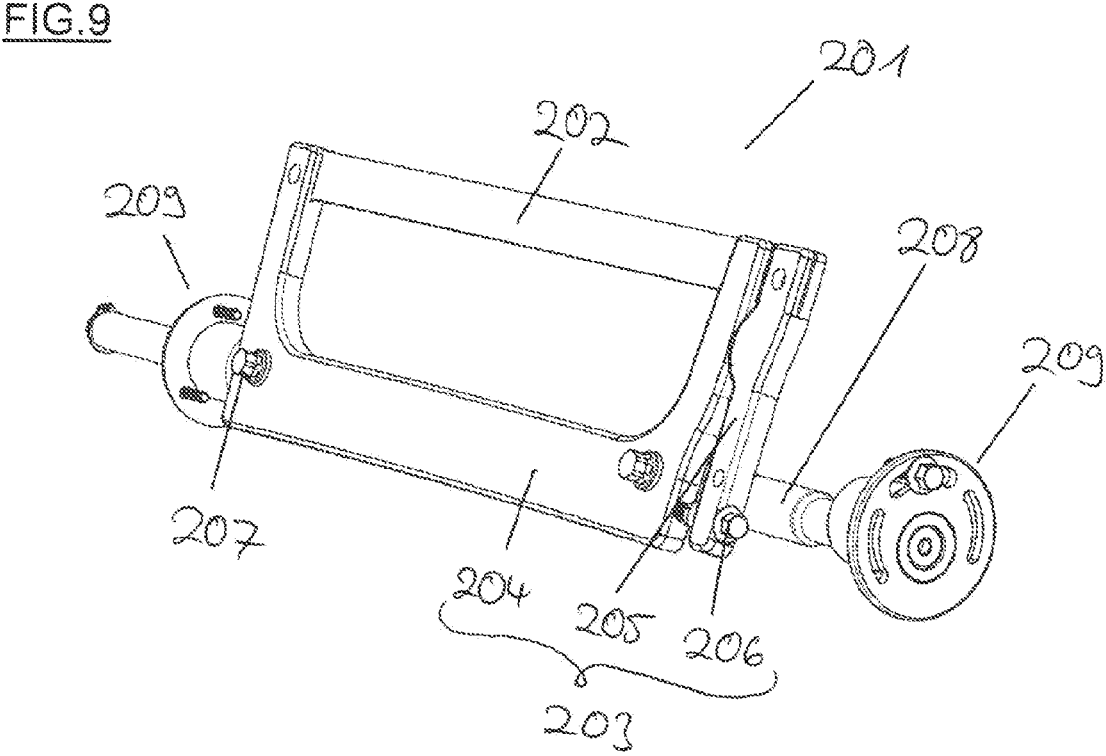
FIG. 9: shows a perspective view of the cutting tool of an embodiment of a cookie molding machine according to the invention.

FIG. 9 shows the cutting tool (201) of the cutting device (200) in an embodiment according to the invention of a cookie molding machine (1) in a perspective view. The cutting tool (201) has a band knife (202) which is able to be tensioned with the aid of a tensioning device (203). The tensioning device (203) has a tensioning bracket (204), a tensioning lever (205) and a tensioning screw (206). The band knife (202) on the left side is connected to the tensioning bracket (204) and on the right side is connected to the tensioning lever (205). With the aid of the tensioning screw (206), the tensioning lever (205) is able to be moved about a lever axis such that the band knife (202) is able to be tensioned or relaxed in the tensioning device (203).

The cutting tool (201) in the region of the tensioning bracket (204), with the aid of fastening means (207) that are configured as grooves, is connected to a knife shaft (208). The knife shaft (208) on both sides is in each case rotatably mounted in a bearing (209).

Figure 10:
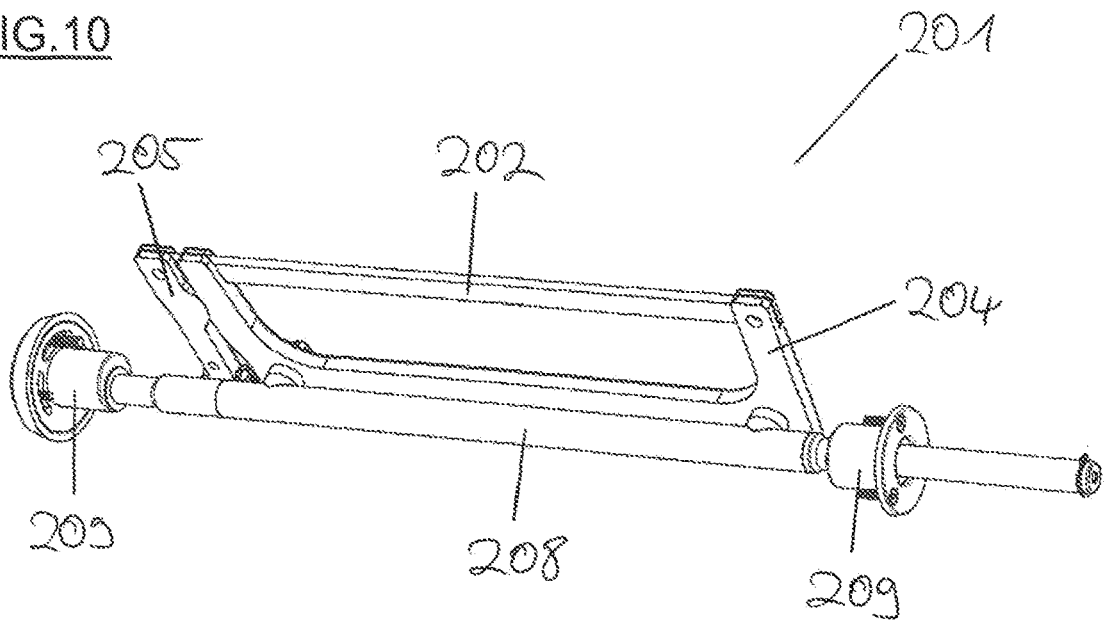
FIG. 10: shows a further perspective view of the cutting tool from FIG. 9.

In FIG. 10, the cutting tool (201) shown in FIG. 9 is illustrated in a perspective view when viewed from another side. The knife shaft (208) on the left side is eccentrically mounted in the bearing (209).

Figure 11:
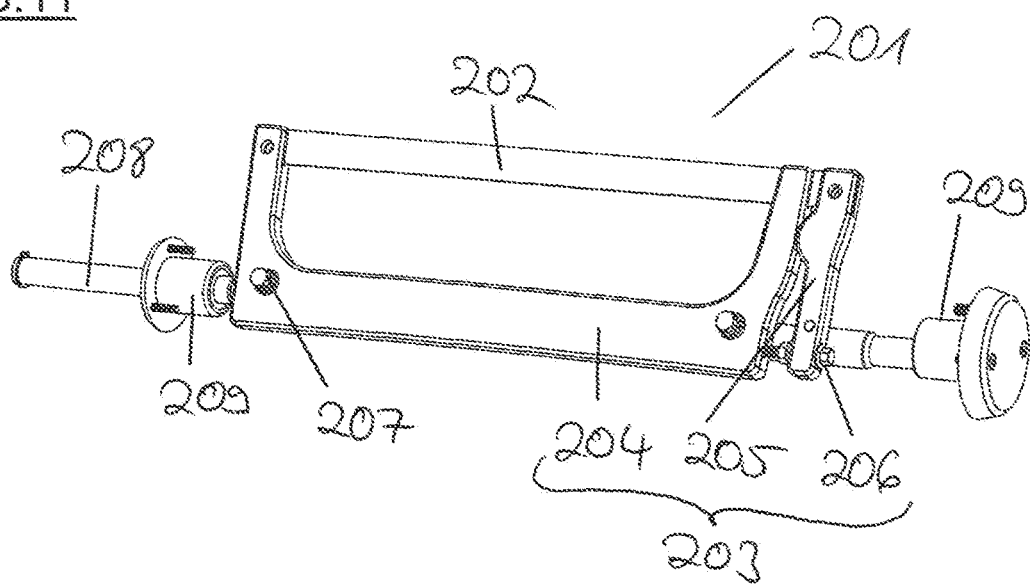
FIG. 11: shows a further perspective view of a cutting tool of a cookie molding machine according to the invention.

FIG. 11 shows a further perspective illustration of an embodiment of a cutting tool (201) of a cookie molding machine (1) according to the invention.

Figure 12:
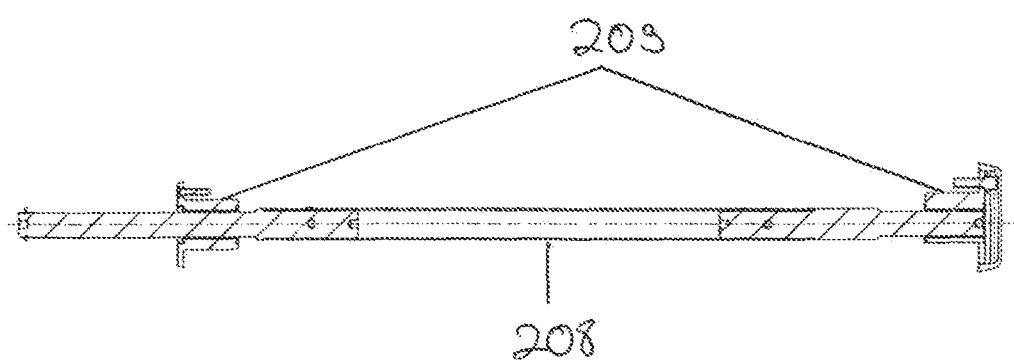
FIG. 12: shows a section in the region of the knife shaft of the cutting device of an embodiment of a cookie molding machine according to the invention.

Illustrated in FIG. 12 is a section in the region of the knife shaft (208) of the cutting device (200) of an embodiment according to the invention of a cookie molding machine (1). The knife shaft (208) in a lightweight construction mode is manufactured in such a manner that said knife shaft (208) in a central region between the bearings (209) is embodied as a tube and is reinforced so as to form a solid bar only in the region of the bearings (209).

Figure 13:
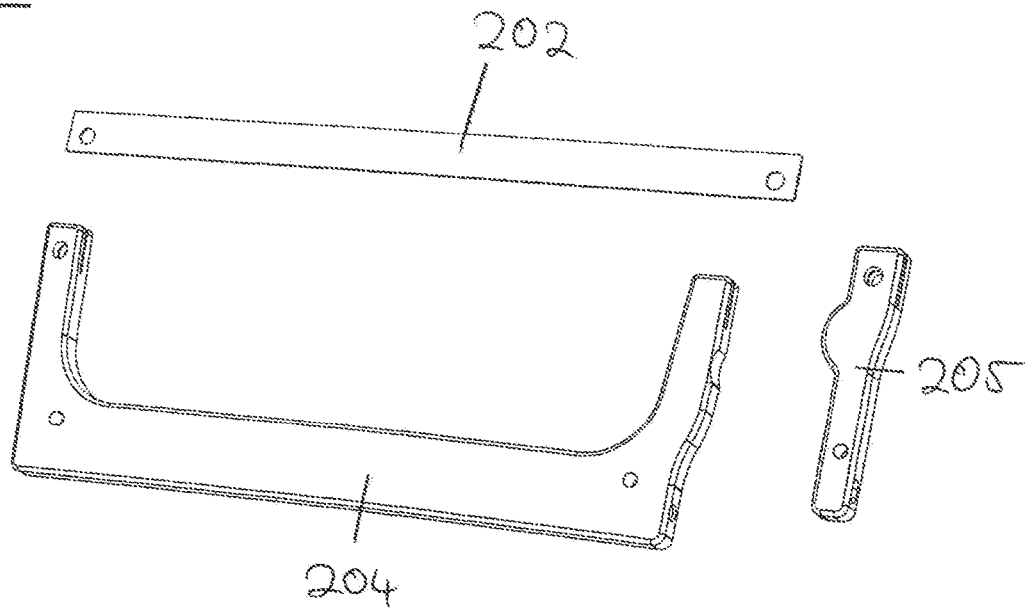
FIG. 13: shows a perspective view of several substantial elements of the cutting tool shown in FIGS. 9 and 10.

FIG. 13 shows several components of the cutting tool (201) of an embodiment according to the invention of a cookie molding machine (1). Illustrated are the band knife (202), the tensioning bracket (204) and the tensioning lever (205). The tensioning bracket (204) on the side configured for connecting to the tensioning lever (205) has an adapted contour such that the tensioning lever (205) is able to be rotatably mounted in a depression having a correspondingly configured appendage in the manner of a construction. Furthermore, the tensioning bracket (204) and the tensioning lever (205) have a thread, or an opening, respectively, for receiving a tensioning screw (206).

Figure 14:
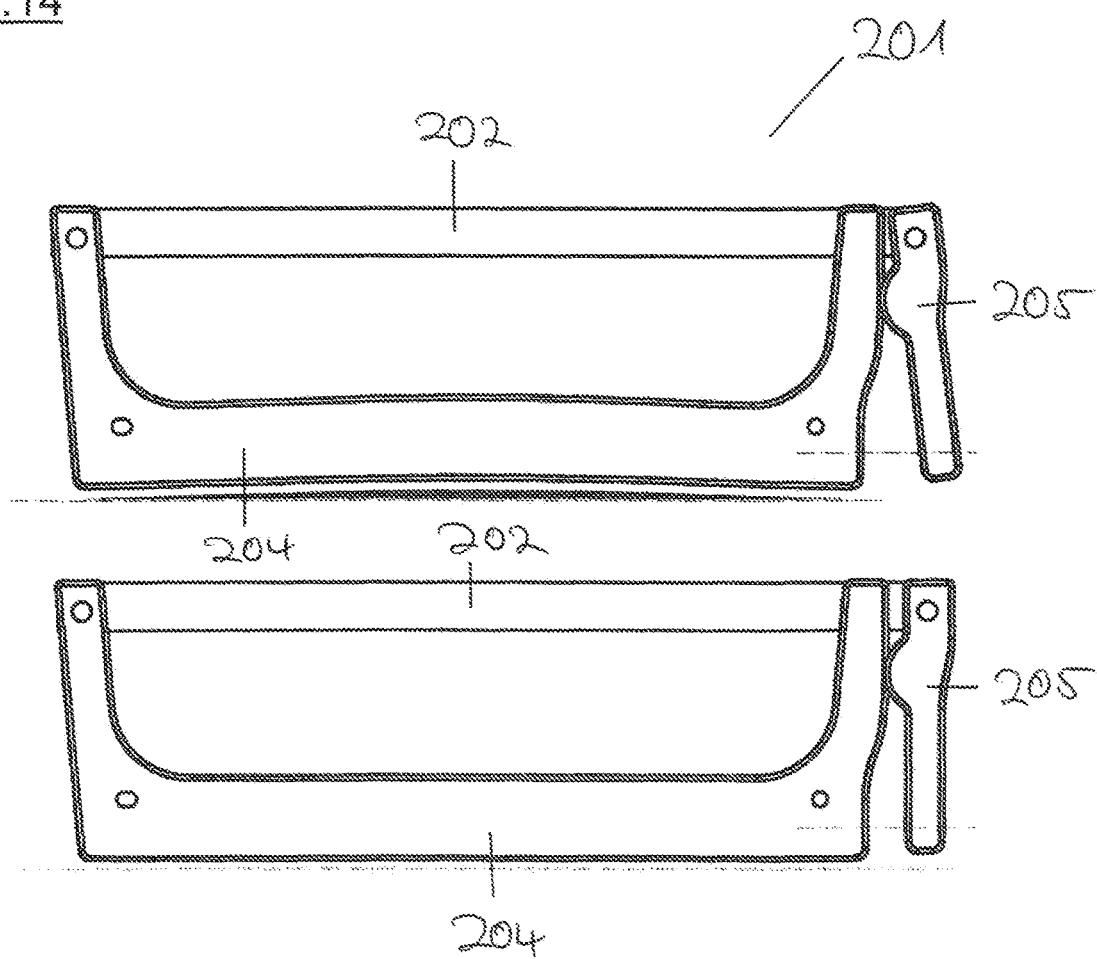
FIG. 14: shows two schematic illustrations of an embodiment of a cutting tool of a cookie molding machine according to the invention.

Illustrated in FIG. 14 is the cutting tool (201) of an embodiment according to the invention of a cookie molding machine (1), in the upper part of the figure having a tensioning lever (205) disposed in a relaxed position, and in the lower part of the figure having a tensioning lever (205) disposed in a tensioned position. It can be seen that the tensioning bracket (204) in the relaxed state of the tensioning device (203) has a concave curvature in the spine region, while this curvature is able to be reduced or completely straightened as a result of the tension of the tensioning device (203). The curvature of the tensioning bracket (204) here also serves as a visual check to verify whether the band knife (202) is sufficiently tensioned.

Figure 15:
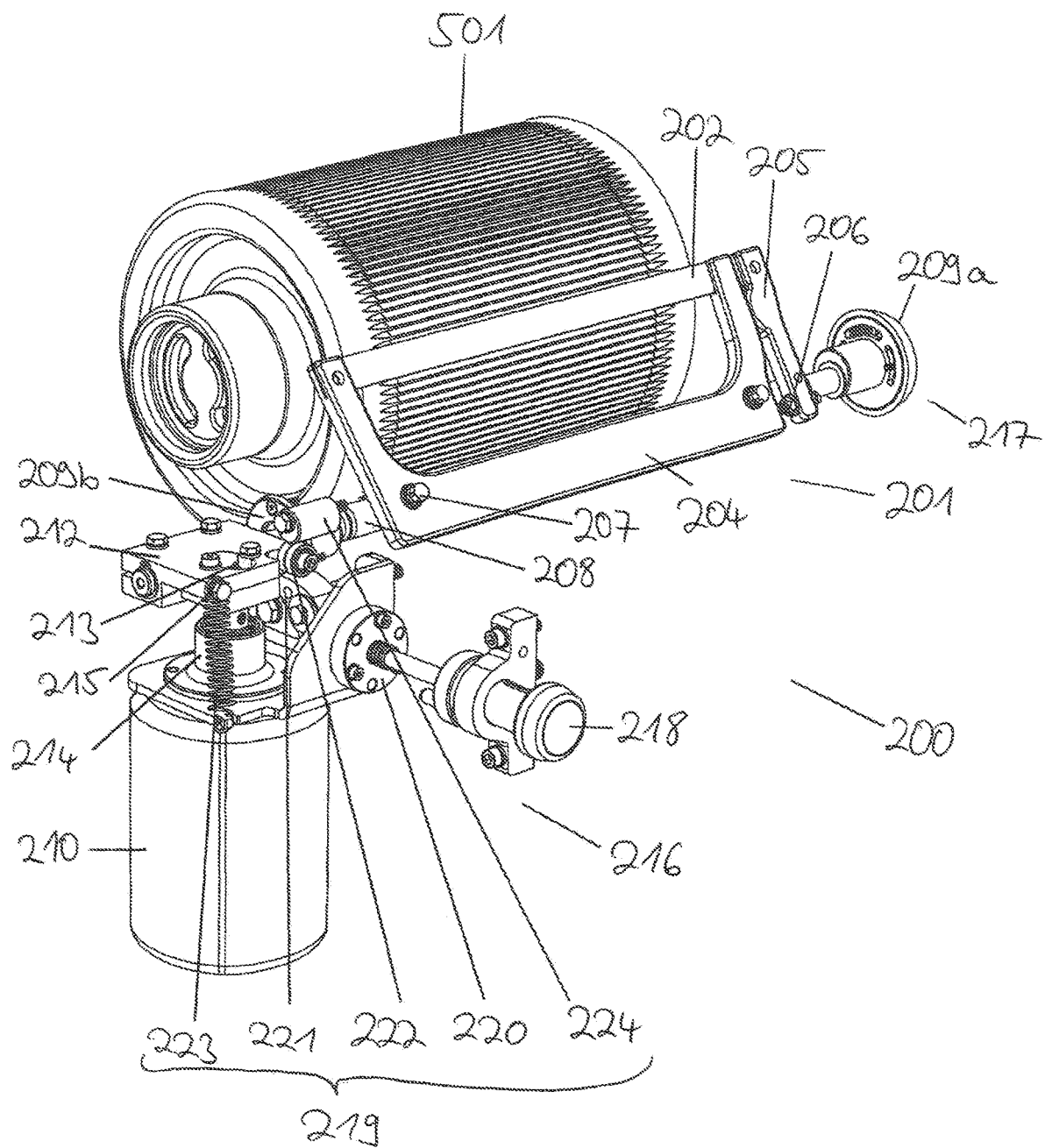
FIG. 15: shows a perspective illustration of a fragment of an embodiment of a cookie molding machine according to the invention in the region of the cutting device.

FIG. 15 shows a perspective illustration of a fragment of an embodiment according to the invention of a cookie molding machine (1) in the region of the cutting device (200). The band knife (202) of the cutting device (200) is aligned toward the shell surface of the kneading roller (501). With the aid of the knife drive (210), the knife shaft (208) and the cutting tool (201) connected to the knife shaft (208) are able to be driven in an oscillating manner such that the band knife (202) is movable in a reciprocating manner so as to be approximately parallel to the rotation axis of the kneading roller (501). The knife drive (210) has a rotating motor, the rotating movement of the latter, with the aid of a transmission mechanism (211), being able to be converted to an oscillating translatory movement and transmitted to the knife shaft (208).

To this end, the transmission mechanism (211) has a block (212) which is connected to the knife shaft (208) and in which an opening (213) configured as a slot having a direction of longitudinal extent perpendicular to the axis of the knife shaft (208) is disposed. A roller bearing (214) which is eccentrically mounted on the motor shaft of the knife drive (210) and is rotatable about the rotation axis parallel to the rotation axis of the knife drive (210) is disposed in the opening. A slider (215) which has a corresponding opening and is screwed to the block (212) is disposed in the region of the opening (213).

Furthermore, the cutting device (200) has a pivoting device (216) which by rotating the knife shaft (208) serves for adjusting the position of the band knife (202) in relation to the kneading roller (501). To this end, the pivoting device (216) has a set screw (218) which with the aid of a coupling mechanism (219) is coupled to the knife shaft (208). To this end, the coupling mechanism (219) has a locking disk (220) for adjusting the knife position in defined steps, a cam (221), and a contact element (222) which is configured as a roll so that the translatory movement of the knife shaft (208) is able to be decoupled from the remaining coupling mechanism (219) of the pivoting device of the axle connected to the set screw (218) during an adjustment is able to be converted to a rotating movement which is able to be transmitted from the cam (221) to the knife shaft (208) by way of the contact element (222). In order for the pivoting capability of the knife shaft (208) and of the connected cutting tool (201) to be restricted, the cutting device (200) has a detent element (224) on which the contact element (222) impacts as soon as the latter has been pivoted so far about the knife shaft (208). Damage to the cutting tool (201) and/or to the kneading roller (501) as a result of contact between the band knife (202) and the kneading roller (501) can be avoided as a result. Furthermore, the coupling mechanism (219) has a spring element (223) by way of which the contact element (222) can be kept in contact with the cam (221).

The knife shaft (208) at the side of the knife drive (210) and the pivoting device (216) is mounted in a centric bearing (209b) and at the other side is mounted in an eccentric bearing (209a). The eccentric bearing (209a) is part of an adjustment installation (217) for adjusting the bearing position of the cutting tool (201).

Figure 16:
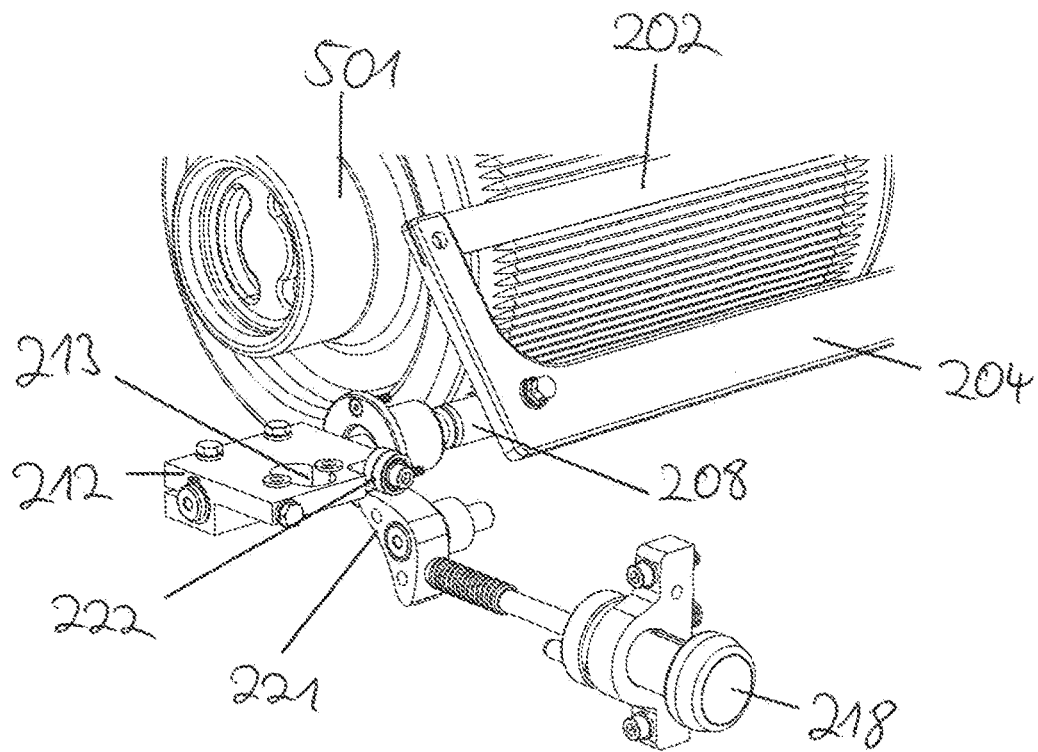
FIG. 16: shows a further perspective illustration of a fragment of an embodiment of a cookie molding machine according to the invention in the region of the cutting device.

A further perspective illustration of a fragment of an embodiment according to the invention of a cookie molding machine (1) in the region of the cutting device (200) is illustrated in FIG. 16.

Figure 17:
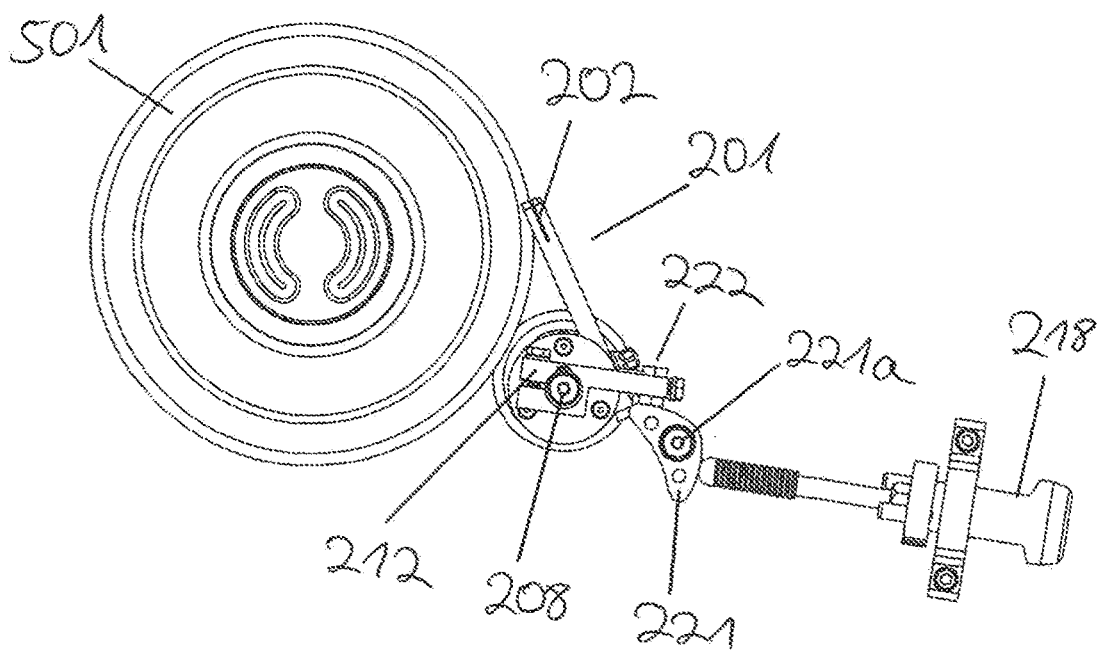
FIG. 17: shows a lateral view of the fragment of a cookie molding machine illustrated in FIG. 16.

FIG. 17 shows a lateral view of the fragment of a cookie molding machine (1) illustrated in FIG. 16. The band knife (202) is aligned toward the shell surface of the kneading roller (501). The block (212) comprises the knife shaft (208) and is braced on the latter with the aid of a screw. With the aid of the set screw (218), a force can be exerted on the cam (221) so that the latter is rotatable about the rotation axis (221a) thereof.

Figure 18:
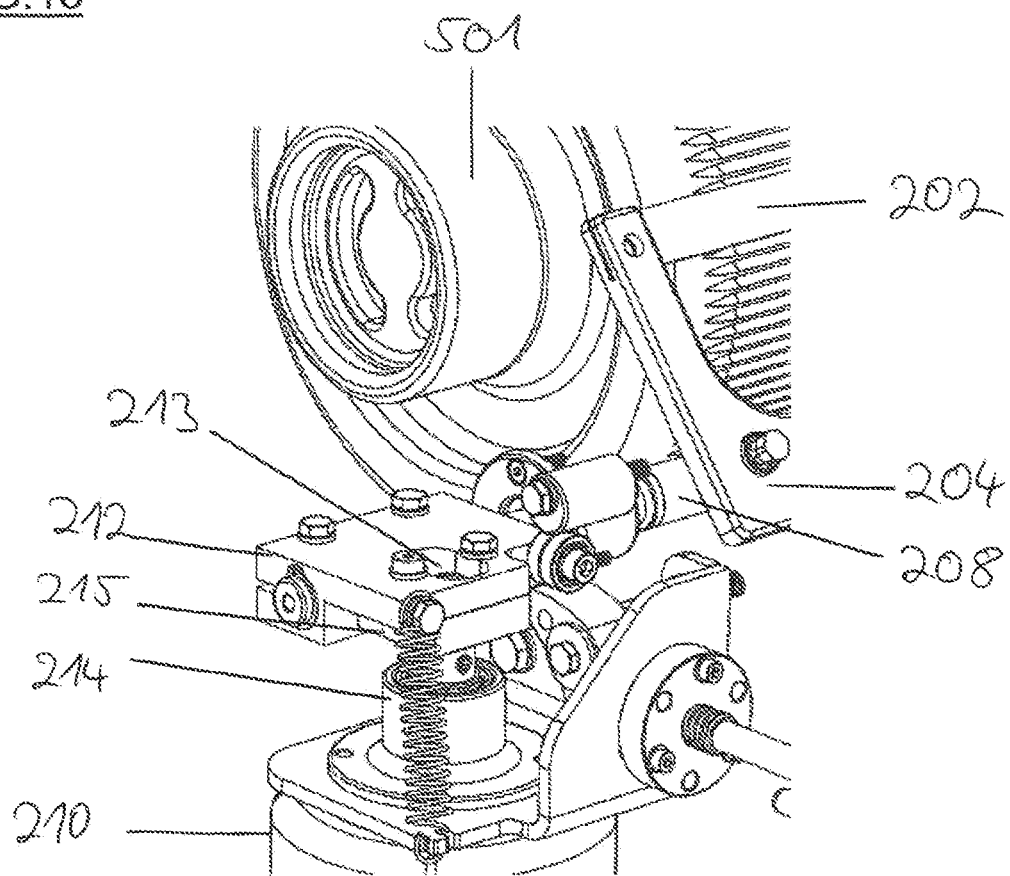
FIG. 18: shows a further perspective illustration of a fragment of an embodiment of a cookie molding machine according to the invention in the region of the cutting device.

A further perspective illustration of a fragment of an embodiment according to the invention of a cookie molding machine (1) in the region of the knife drive (210) of the cutting device (200) is illustrated in FIG. 18.

Figure 19:
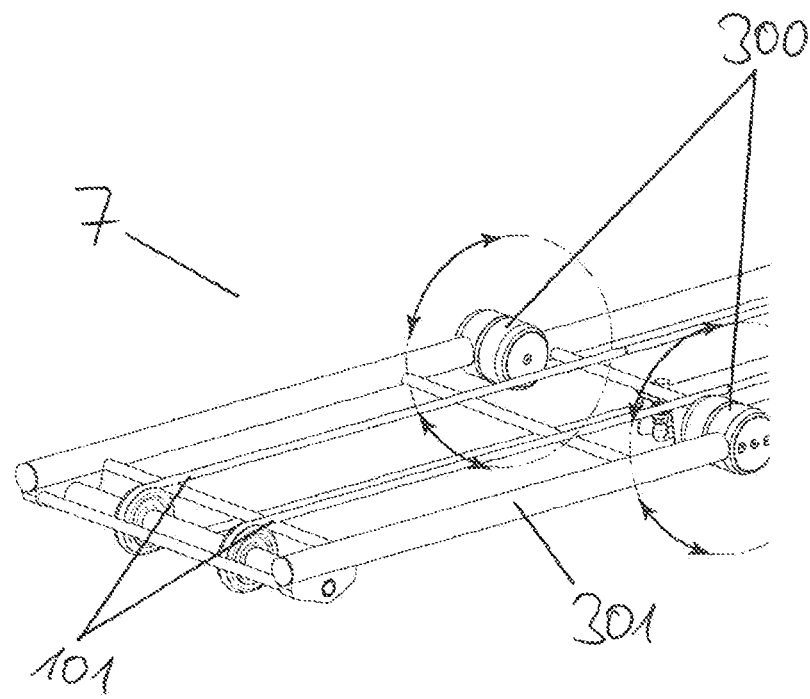
FIG. 19: shows a perspective view of an embodiment of a cookie molding machine according to the invention in the region of a fragment of the second transport device.

FIG. 19 shows a perspective view of an embodiment according to the invention of a cookie molding machine (1) in the region of a fragment of the second transport device (7). The second transport device (7) is configured for transporting baking trays (60) and has two transport belts (101) configured as conveyor belts. The frame of the second transport device (7) is implemented by rails (301). Joints (300) by way of which the second transport device (7) is able to be folded are disposed in the region of the rails (301).

Figure 20:
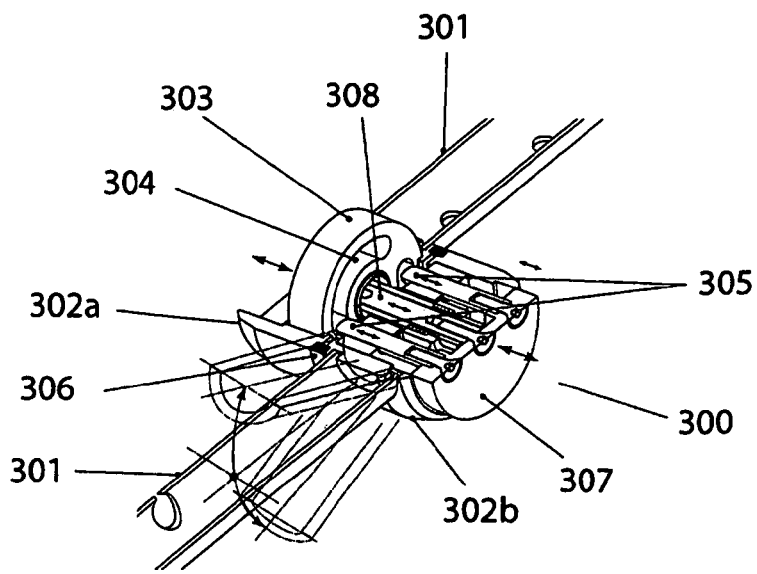
FIG. 20: shows a sectional illustration of a joint of an embodiment of a cookie molding machine according to the invention.

A sectional illustration of a joint (300) of an embodiment according to the invention of a cookie molding machine (1) is illustrated in FIG. 20. The joint (300) has a stationary housing part (302a) and a movable housing part (302b) and is connected by rails (301). The rail (301) illustrated in the left region of the drawing is connected to the movable part of the joint (300) and is thus likewise movable, this being illustrated by the additionally illustrated positions of the rail (301) in dashed lines.

The joint (300) furthermore has a guide element (303) which is configured as a perforated disk. The guide element (303) has a guide structure (304) which are configured as two toroidal grooves or openings, respectively, in the guide element (303). The housing (302) of the joint (300) is configured so as to be hollow-cylindrical and on the sides thereof is closed by end caps (307). The end cap (307) of the movable housing part (302b), with the aid of screws, is connected to two guided elements (305) which are configured in the manner of pins and in the illustrated free position of the joint (300) do not protrude into the guide structure (304) of the guide element (303). Furthermore, the movable housing part (302b) by way of the end cap (307) is connected to a central guide shank (307) which implements the rotation axis of the joint (300). The central guide shank (307) runs through the central bore of the guide element (303). A sealing ring/slip ring (306) is disposed between the stationary housing part (302a) and the movable housing part (302b).

Those components of the movable housing part (302b) of the joint (300) that are connected to the end cap (307), including the end cap (307) of the stationary housing part (302a), in the axial direction in terms of the rotation axis of the joint (300) are movable by way of a defined stroke such that the guided elements (305) are able to be moved into the guide structure (304) of the guide element (303). In the locked position of the joint (300) that can be initiated as a result, a movement of the movable part is possible only in the context of the guide of the guide element (303) such that the movable rail (301) in the exemplary embodiment illustrated is able to be folded only upward.

Figure 21:
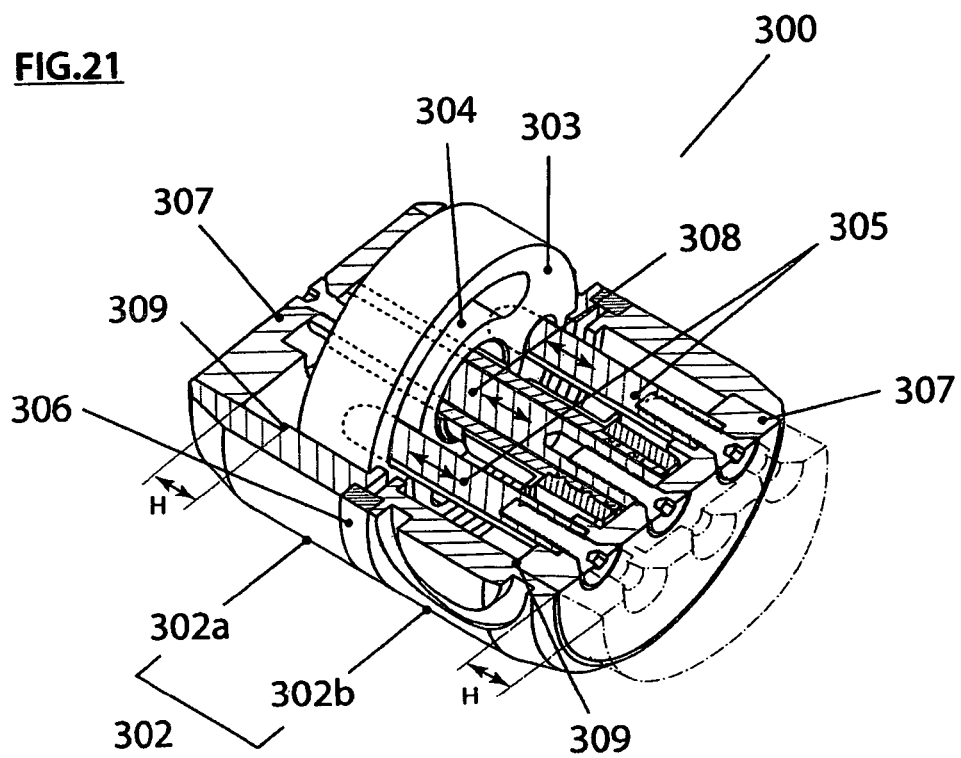
FIG. 21: shows a further sectional illustration of a joint shown in FIG. 20.

FIG. 21 shows a further sectional view of the joint (300) shown in FIG. 20 in the locked position. The guided elements (305) configured in the manner of pins protrude into the guide structure (304) of the guide element (304), said guide structure (304) being configured as grooves. It can furthermore be seen that the central guide shank (308) with the aid of screws is connected to both end caps (307). Those elements of the joint (300) which are highlighted in gray, in contrast to the remaining part of the illustration, in the axial direction of the rotation axis of the joint (300) are displaceable by the stroke H. The stroke H here is in each case restricted by a shoulder (309) on the inside of the stationary housing part (302a) and of the movable housing part (302b), said shoulders (309) reducing the internal diameter of the respective housing part such that said internal diameter is smaller than the diameter of the end caps (307).

The position of the end cap (307) in the free position of the joint (300) is illustrated with dashed lines on the right side of the drawing.

Figure 22:
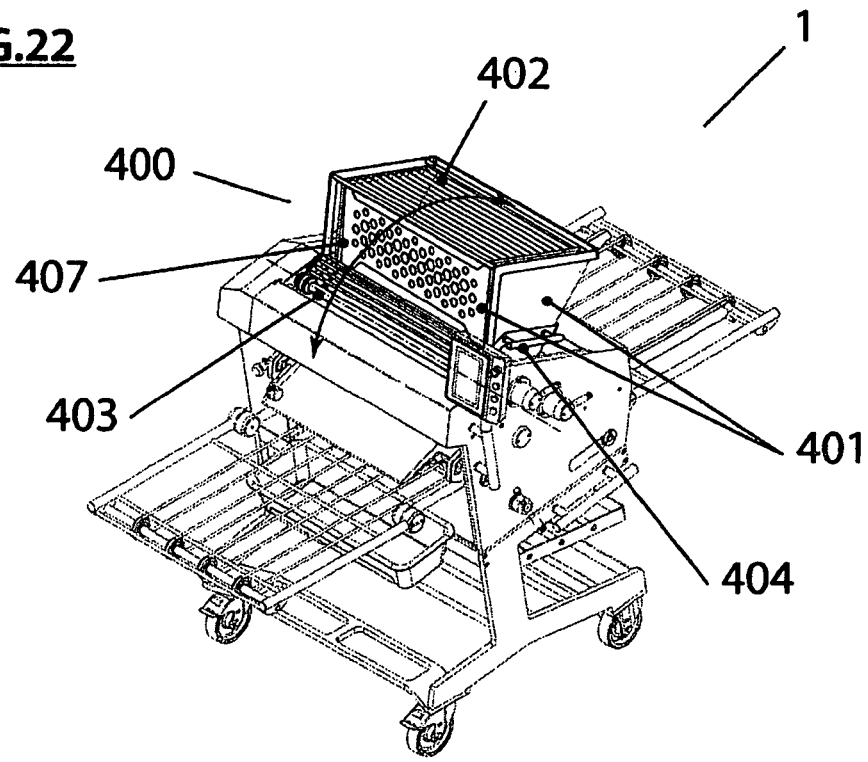
FIG. 22: shows a perspective view of an embodiment of a cookie molding machine according to the invention viewed from obliquely above.

A perspective view of an embodiment according to the invention of a cookie molding machine (1) when viewed obliquely from above is illustrated in FIG. 22, wherein the infeed installation (400) which is configured as a funnel is set apart from the remaining part of the cookie molding machine (1). The funnel of the infeed installation (400) is laterally delimited by four funnel walls (401) and toward the top is closed by a funnel lid (402). The funnel lid (402) is pivotable about a pivot axis (403) such that the funnel can be opened for infeeding dough, for example. The funnel of the infeed installation (400) laterally has funnel side brackets (404) which also serve as guards to protect hands from being inserted into the cookie molding machine (1).

Figure 23:
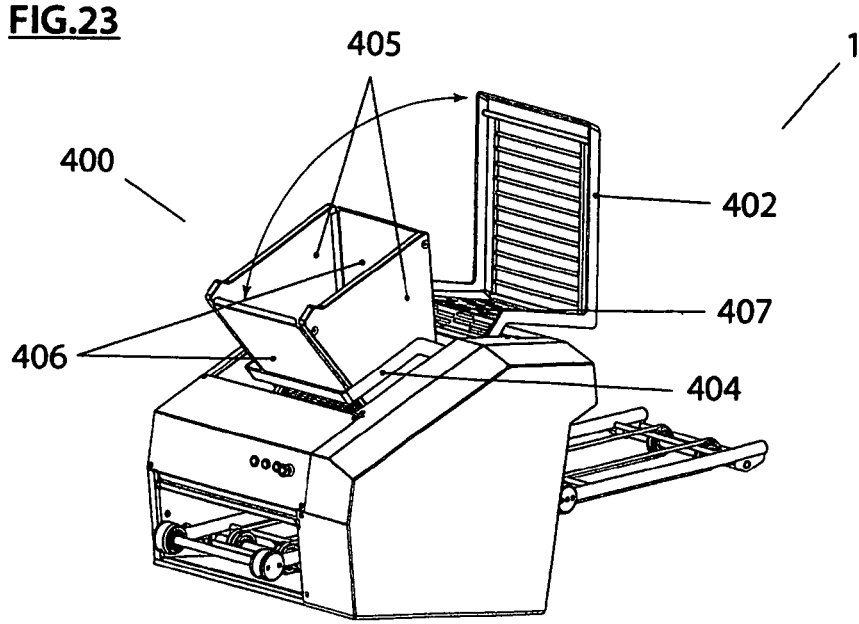
FIG. 23: shows a perspective view of a fragment of an embodiment of a cookie molding machine according to the invention in the region of the infeed installation.

FIG. 23 shows a perspective view of a fragment of an embodiment according to the invention of a cookie molding machine (1) in the region of the infeed installation (400), having an opened funnel. The funnel on the front side thereof and the rear side thereof has retrievable funnel panels (406). As a protection against hands being inserted into the cookie molding machine (1) in the event of a closed funnel lid (402) and a removed funnel panel (406) on the rear side, the infeed installation (400) has a protective wall element (407) which is configured as a funnel protection panel and in the embodiment of the invention illustrated is pivotable conjointly with the funnel lid (402).

Figure 24:
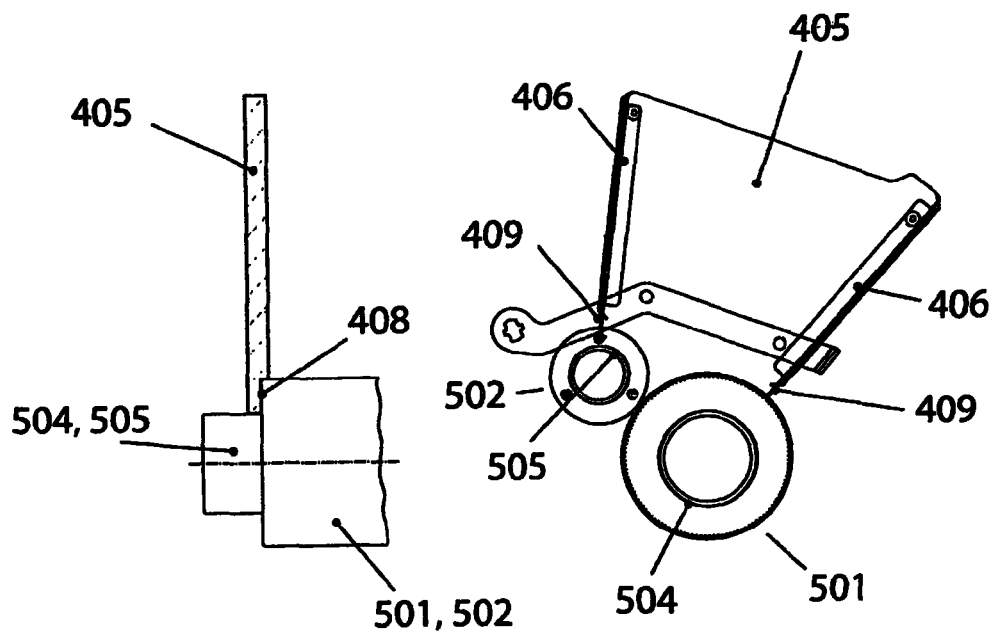
FIG. 24: shows a schematic sectional illustration in the region of the infeed installation of an embodiment of a cookie molding machine according to the invention.

A schematic sectional illustration in the region of the infeed installation (400) of an embodiment according to the invention of a cookie molding machine (1) is illustrated in FIG. 24. The funnel walls (401) on the lower side of the infeed installation (400) are directly adjacent to the molding roller (502) and the kneading roller (501) of the molding device (500) of the cookie molding machine (1).

It is illustrated in the left part of FIG. 24 how the funnel walls (401) are designed so as to seal the funnel toward the bottom. The lateral walls (405) on the lower side have in each case one planar recess (408) so that the lateral wall (405) is able to be placed onto the respective roller shoulder (504, 505) and in regions bears tightly over the shell surface of the respective roller so as to protrude beyond the latter.

It can furthermore be seen in the right part of FIG. 24 that the contour of the lateral walls (405) is adapted to the round shape of the molding roller (502) and of the kneading roller (501) in the region of the respective roller shoulder (504, 505).

Furthermore, the funnel of the infeed installation (400) in the lower region has ramps (409).

Figure 25:
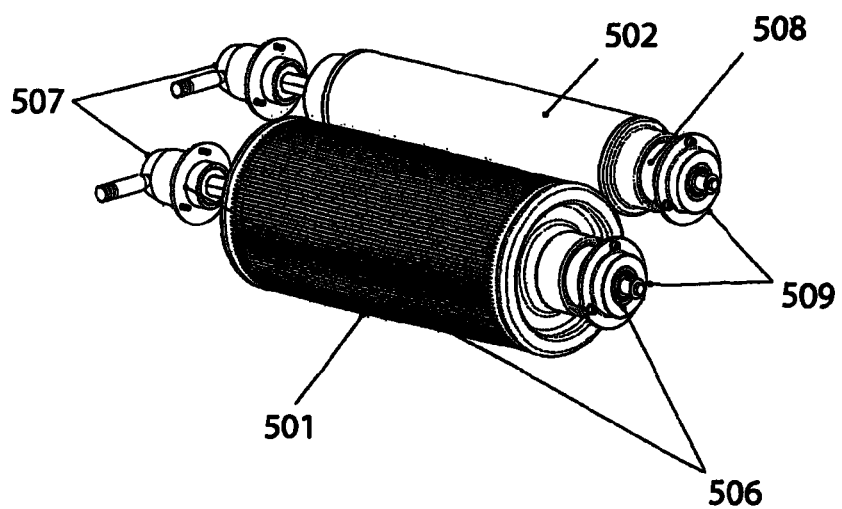
FIG. 25: shows a perspective view of a fragment of an embodiment of a cookie molding machine according to the invention in the region of the rollers of the molding device.

FIG. 25 shows a perspective view of a fragment of an embodiment according to the invention of a cookie molding machine (1) in the region of the rollers (501, 502) of the molding device (500). Each of the rollers (501, 502) is in each case locked by a roller locking mechanism (506).

With the aid of the roller locking mechanism (506), the rollers (501, 502) are in each case able to be mounted and rotatable between two roller flanges (508). The roller locking mechanism (506) on one side of the respective roller (501, 502) has a spring-mounted bearing (509). The fixing installation (507) of the respective roller locking mechanism (506) is disposed on the respective other side of the respective roller (501, 502).

Figure 26:
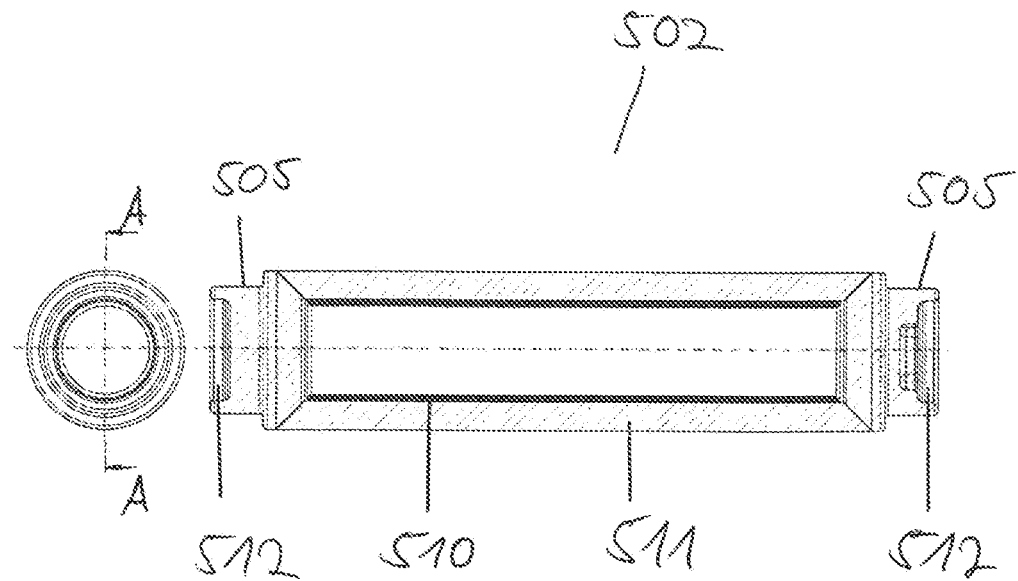
FIG. 26: shows a lateral view and a section along the longitudinal axis of the molding roller of an embodiment of a cookie molding machine according to the invention.

Illustrated in FIG. 26 is a lateral view and a section along the axis A-A of the molding roller (502) of an embodiment according to the invention of a cookie molding machine (1). The molding roller (502) has a roller core (510) configured as a tube, wherein the tube is manufactured from metal, for example. The roller core (510) is enclosed by a roller casing (511) which is preferably manufactured from a thermoplastics material. The roller shoulders (505) of the molding roller (502) have in each case one receptacle socket (512), said receptacle sockets (512) being open toward the outside and being configured as a recess in the manner of a circular disk in the material of the roller shoulders (505).

Figure 27:
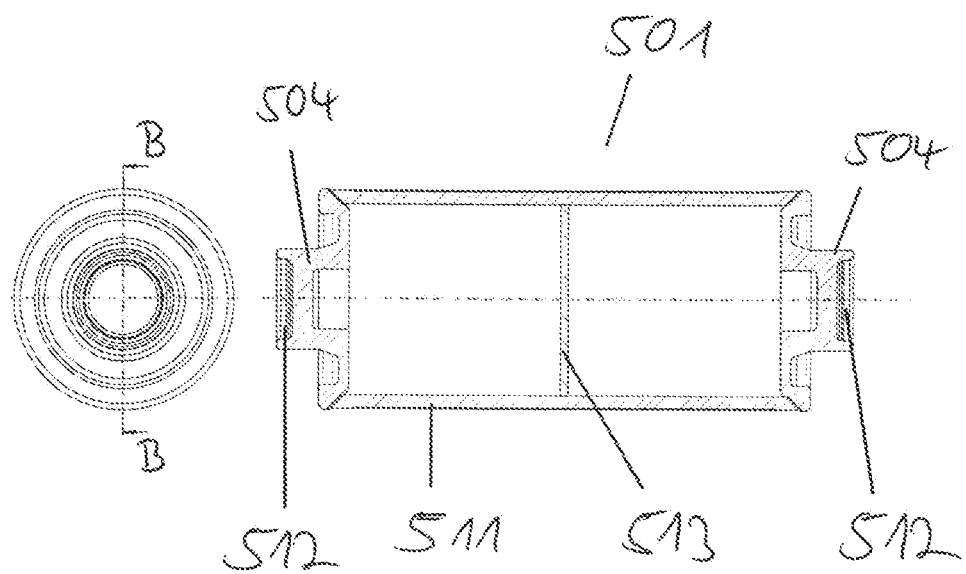
FIG. 27: shows a lateral view and a section along the longitudinal axis of the kneading roller of an embodiment of a cookie molding machine according to the invention.

FIG. 27 shows a lateral view and a section along the axis B-B of the kneading roller (501) of an embodiment according to the invention of a cookie molding machine (1). The kneading roller (501) has a roller casing (511) which encloses a cavity. The roller casing (511) is reinforced with a support wall (513) which is centric in the kneading roller (501). The roller shoulders (504) of the kneading roller (502) have in each case one receptacle socket (512), said receptacle sockets (512) being open toward the outside and being configured as a recess in the manner of a circular disk in the material of the roller shoulders (504).

Figure 28:
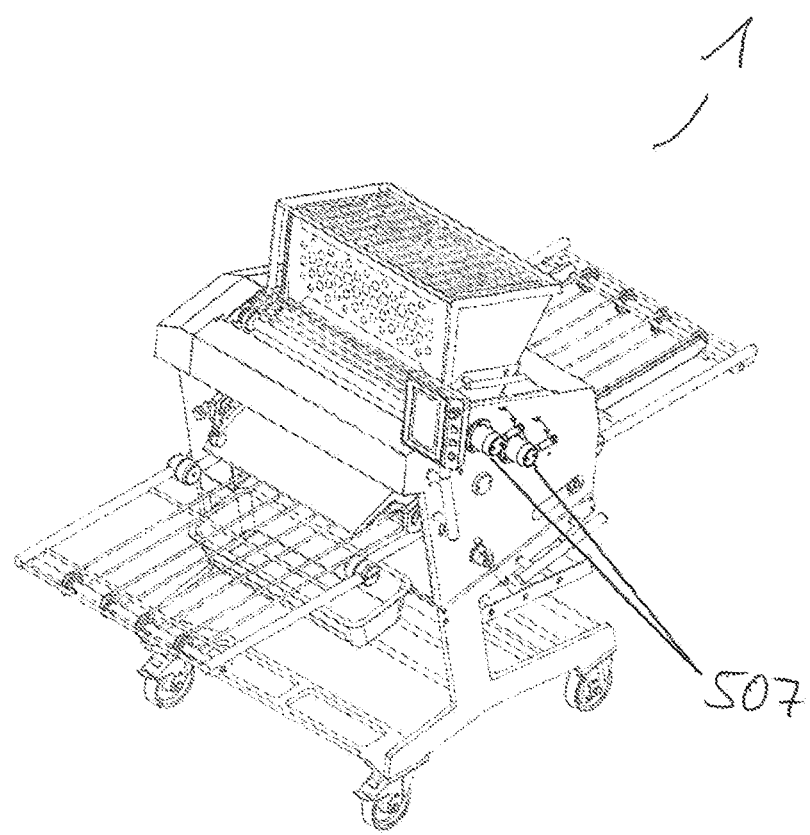
FIG. 28: shows a perspective view of an embodiment of a cookie molding machine according to the invention.

A perspective view of an embodiment according to the invention of a cookie molding machine (1) is illustrated in FIG. 28. The fixing installations (507), configured as quick clamping installations, of the roller locking mechanism (506) of the molding roller (502) and of the kneading roller (501) are highlighted.

Figure 29:
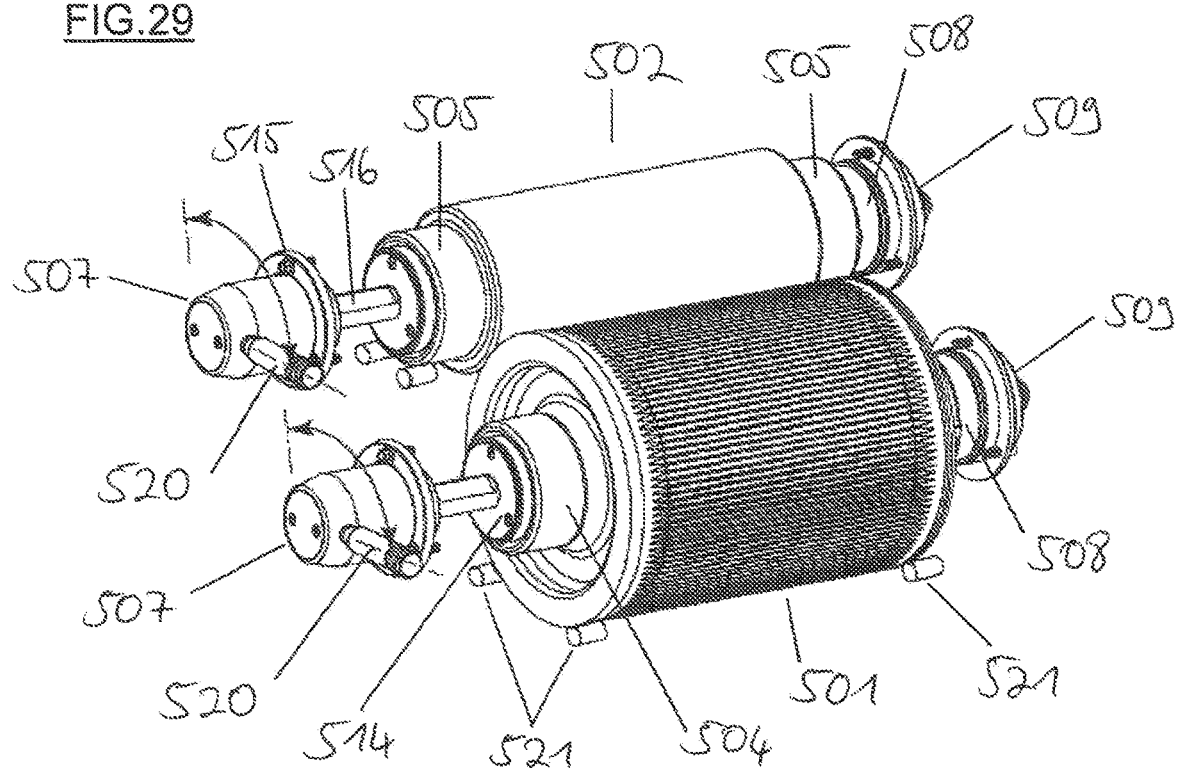
FIG. 29: shows a perspective view of an embodiment of a cookie molding machine according to the invention in the region of the molding roller and the kneading roller.

FIG. 29 shows a perspective view of an embodiment according to the invention of a cookie molding machine (1) in the region of the molding roller (502) and the kneading roller (501). The molding roller (502) and the kneading roller (501) at the right side, by way of the receptacle socket (512), are in each case pushed onto a roller flange (508) which is in each case rotatably mounted in a spring-mounted bearing (509). In order to simplify the assembly of the rollers, the cookie molding machine (1) has a placement device (521), which is configured as a positioning pin. The rollers are able to be placed onto these positioning pins so as to be relatively close to the position envisaged for the operation of said rollers. The molding roller (502) and the kneading roller (501) at the respective left side are fixed with the aid of the fixing installation (507). The fixing installations (507) in the illustrated embodiment of the invention are configured as quick clamping installations. A roller flange (508) which is in each case configured as a locking flange (514) and by way of a cotter pin (516) is connected to the remaining part of the fixing installation (507) sits in each of the respective receptacle sockets (512). The fixing installations (507) are in each case fastened to the cookie molding machine (1) by way of one fastening flange (515). In order for the fixing installation (507) to be activated, said fastening flanges (515) have in each case one lever (520).

Figure 30:
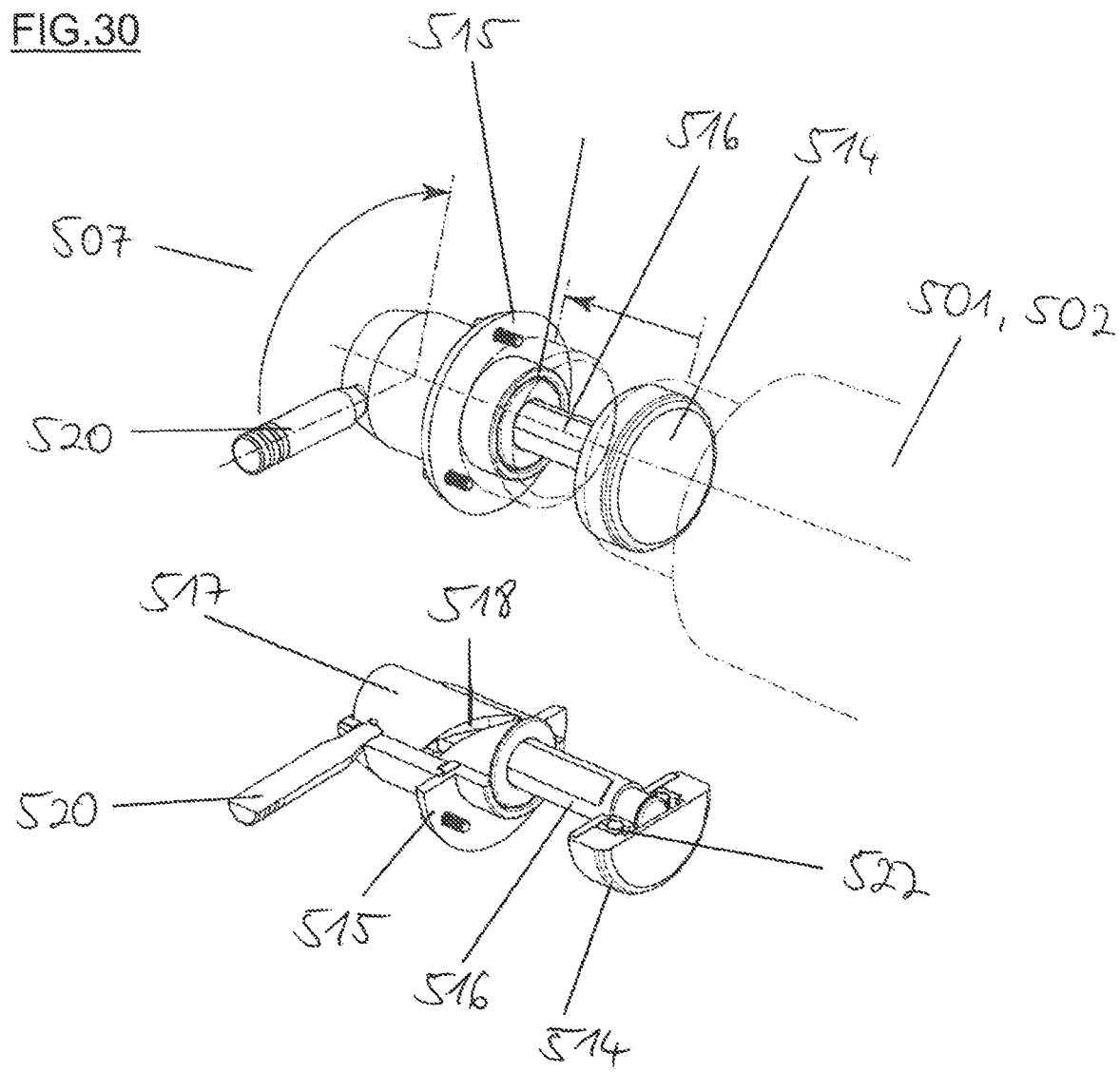
FIG. 30: shows a perspective detailed view of part of the roller locking mechanism of an embodiment of a cookie molding machine according to the invention.

Illustrated in FIG. 30 is a perspective detailed view of part of the roller locking mechanism (506) of an embodiment according to the invention of a cookie molding machine (1). The locking flange (514) which is braced in the receptacle socket (512) of a roller is able to be moved out of the latter by rotating the fixing installation (507) with the aid of the lever (520).

The construction of the fixing installation (507) implemented as a quick clamping installation is illustrated in a sectional view in the lower part of FIG. 30. The fixing installation (507) has a friction sleeve (517) which is connected to the lever (520) and has an internal helical groove (518). The cotter pin (516) is mounted so as not to be rotatable in the friction sleeve (518). The cotter pin (516) has an entrainment pin (519) which protrudes radially from said cotter pin (516) and is disposed in the helical groove (518). As a result of being guided in the helical groove (518) a force as a result of a rotation of the friction sleeve (517) is exerted on the cotter pin (516) by way of the entrainment pin (518), and said cotter pin is moved along the rotation axis of the roller. In the region of the locking flange (514), the cotter pin (516) is rotatably mounted by a roller bearing (522) configured as a ball bearing. The cotter pin (516) is flattened on two sides, wherein this contour corresponds to the receptacle of the cotter pin (516) in the fastening flange (515) so that a rotation of the cotter pin (516) about the longitudinal axis thereof is prevented.

Figure 31:
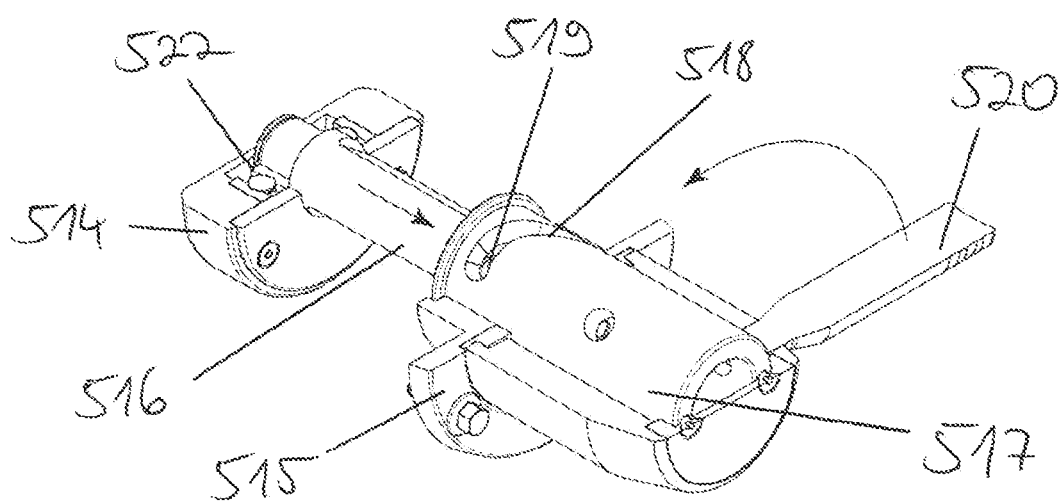
FIG. 31 shows a further perspective view of the roller locking mechanism of an embodiment of a cookie molding machine according to the invention shown in FIG. 30.

FIG. 31 shows a further perspective illustration of the roller locking mechanism (506) of an embodiment according to the invention of a cookie molding machine (1) shown in FIG. 30.

The invention claimed is:

1. A cookie molding machine, comprising: an infeed installation for a dough; a molding device for shaping dough pieces; a cutting device for separating the dough pieces from a dough sheet; and at least one first transport device for transporting the dough pieces out of a region of the cutting device toward a transfer region, wherein the molding device includes a rotating molding roller and a counter-rotatable kneading roller disposed at a specific mutual spacing with parallel rotation axes, such that a dough sheet is able to be configured about a shell surface of the kneading roller, a thickness of the dough sheet being determined by the spacing of the kneading roller and the molding roller, wherein the molding roller in a region of the shell surface thereof has at least one recess or depression, respectively, which serves as a mold and thus as a negative for the dough pieces to be shaped, such that raised quantities of dough are able to be applied to the dough sheet configured about the kneading roller, said raised quantities of dough being positives of the mold, respectively, disposed on the molding roller, wherein a cutting tool of the cutting device is disposed so as to be behind the molding roller in a rotation direction of the molding roller and wherein the dough positives that have been applied to the dough sheet by the mold of the molding roller are able to be cut off from the dough sheet by the cutting tool, wherein said molding device is configured to enable installing, cleaning and servicing of the cookie molding machine and/or individual modules.

2. The cookie molding machine according to claim 1, wherein the first transport device includes a belt cartridge that is retrievable from the cookie molding machine, wherein the belt cartridge has a guide, a belt drive roller, a deflection and tension roller and a transport belt that runs on the guide, is driven by the belt drive roller and is tensioned by the deflection and tension roller, and wherein the belt cartridge has an adjustment wheel for adjusting running of the belt whereby positioning of the transport belt in a direction transverse to a running direction is enabled by the adjustment wheel.

3. The cookie molding machine according to claim 2, wherein the belt cartridge has a connection system that communicates with an installation location of the belt cartridge in the cookie molding machine so that the belt cartridge is reliably guided when being inserted into as well as when being retrieved from the cookie molding machine.

4. The cookie molding machine according to claim 2, further comprising a motor for driving the transport belt of the belt cartridge, the motor being disposed outside the belt cartridge in the cookie molding machine.

5. The cookie molding machine according to claim 1, wherein the cutting device has a tensioning device and a band knife that is tensionable by the tensioning device, and wherein the tensioning device has a tensioning bracket and a tensioning lever.

6. The cookie molding machine according to claim 5, wherein the band knife is fastened to a knife shaft, further comprising a knife drive configured to drive the knife shaft to oscillate in an axial direction, and wherein the knife shaft is rotatably mounted, and further comprising a pivoting device that pivots the knife shaft to set the knife position.

7. The cookie molding machine according to claim 6, further comprising an adjustment installation for adjusting the position of the knife shaft so as to guarantee parallelism of a cutting edge of the band knife in relation to a shell surface of the kneading roller.

8. The cookie molding machine according to claim 1, further comprising at least one second transport device configured to transport baking trays, wherein the second transport device has at least one fold-out region that is foldable-out and in a folded-out state protrudes beyond a remaining part of the cookie molding machine, wherein the fold-out region is able to be folded out by at least one externally sealed joint so that a hygienic construction is implemented, wherein the joint has a stationary housing part and a movable housing part, wherein the movable housing part is rotatable about a rotation axis, and wherein the joint further has a locked position in which the movable part of the joint is not rotatable or is rotatable only upward, and a free position in which the movable part of the joint is rotatable upward and downward.

9. The cookie molding machine according to claim 8, wherein the joint has a guide element in which, in the locked position of the joint at least one guided element is able to be guided, wherein the at least one guided element by displacing along the rotation axis or parallel to the rotation axis of the joint is movable out of a guide of the guide element so that the joint is transferable to the free position.

10. The cookie molding machine according to claim 1, wherein the infeed installation is a funnel, wherein the funnel on an end side thereof is at least partially clad with retrievable funnel panels.

11. The cookie molding machine according to claim 10, further comprising a funnel lid that closes the funnel.

12. The cookie molding machine according to claim 10, wherein the funnel has a protective wall element on at least one side that is provided with a retrievable funnel panel.

13. The cookie molding machine according to claim 1, further comprising a respective roller locking mechanism that positions the molding roller and the kneading roller, in each case in positions provided for an operation of the cookie molding machine and fixes the rollers so as to be rotatable about a respective rotation axis of said molding roller and said kneading roller, wherein the respective roller locking mechanism includes a fixing device that clamps the molding roller or the kneading roller laterally between two roller flanges.

14. The cookie molding machine according to claim 13, wherein the molding roller and the kneading roller are spring-mounted on a side that faces away from the fixing device.

15. The cookie molding machine according to claim 13, wherein the fixing device is a quick tensioning device.

* * * * *